United States Patent [19]
Crone et al.

[11] Patent Number: 6,037,943
[45] Date of Patent: *Mar. 14, 2000

[54] MULTIMEDIA DIGITAL FOIL PRESENTATION SYSTEM

[75] Inventors: Joanne Elizabeth Crone, Richmond Hill; Donald Michael Henning, North York; Derek Kent William Smith, Richmond Hill; Brian Anthony Yee, Claremont, all of Canada

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/514,017

[22] Filed: Aug. 10, 1995

[30] Foreign Application Priority Data

Aug. 12, 1994 [CA] Canada ................................. 2130077

[51] Int. Cl.$^7$ ..................................... G06F 3/14
[52] U.S. Cl. .......................................... 345/357
[58] Field of Search ................... 395/356, 357, 395/341, 346, 347, 327, 328, 972, 973; 345/356, 357, 341, 346, 347, 327, 328, 972, 973, 329, 330

[56] References Cited

U.S. PATENT DOCUMENTS

| | | | |
|---|---|---|---|
| 4,821,211 | 4/1989 | Torres | 395/357 |
| 4,876,657 | 10/1989 | Saito et al. | 345/330 |
| 5,204,768 | 4/1993 | Tsakiris et al. | 359/148 |
| 5,363,482 | 11/1994 | Victor et al. | 395/346 |
| 5,469,192 | 11/1995 | Allen et al. | 345/157 |
| 5,500,936 | 3/1996 | Allen et al. | 395/356 X |
| 5,526,011 | 6/1996 | Hix et al. | 345/87 |
| 5,526,480 | 6/1996 | Gibson | 395/341 X |
| 5,539,658 | 7/1996 | McCullough | 345/329 |
| 5,634,018 | 5/1997 | Tanikoshi et al. | 345/329 |
| 5,640,522 | 6/1997 | Warrin | 395/346 |
| 5,917,480 | 6/1999 | Tafoya et al. | 345/302 |

OTHER PUBLICATIONS

"Microsoft PowerPoint Handbook", Microsoft Corporation, pp. 5–7, 10–11, 13, 86, 480–496, 1992.

"Special Delivery Reference Manual", Interactive Media Corporation, pp. 98–100, 1992.

"Harvard Graphics for Windows" (version 2.0), Software Publishing Corporation, pp. 1–2, Nov. 1993.

"Microsoft PowerPoint for Windows" (version 4.0), Microsoft Corporation, pp. 1–2, Nov. 1993.

*Primary Examiner*—Crescelle N. dela Torre
*Attorney, Agent, or Firm*—McGinn & Gibb, P.C.; James C. Pinter

[57] ABSTRACT

A navigator for permitting a presenter to randomly access digitized foils with minimal audience distraction. The navigator includes an on-screen indicator with several fields in a narrow band format that identifies the specific digital foil currently displayed on a presentation medium and also identifies the other digitized foils in the same unit. Using a selector, such as a pointer or keystroke, the presenter can select any other digitized foil within the same unit to replace the current display. To move outside of a specific unit, the presenter simply selects a different unit in the same or a different section within the same module or a different module by selecting other fields displayed on the indicator, again by using a pointer or keystroke. The indicator itself may be hidden from view when not in use, and when in use, may be the same background color as the displayed foil or even be entirely blocked from the audience's view to minimize audience distraction.

66 Claims, 26 Drawing Sheets

MULTIMEDIA DIGITAL FOIL PRESENTATION SYSTEM

FIELD OF THE INVENTION

This invention relates to the area of multimedia digital foil presentation system. More specifically, the invention is directed to a method and apparatus for displaying and navigating a plurality of digital foils having multimedia objects from a range of presentation source materials.

BACKGROUND OF THE INVENTION

The mere enablement of live presentation of information is well known in the art. An overhead foil projector, for example a 3M® Overhead Projector Model 213, provides a light source and lens to focus a beam of light on a screen in a room. By placing a transparent plastic foil or overhead "transparency" having textual or diagrammatic information over a holder, the information from the foil is readily available and readable by an audience from the screen. The presenter then manually selects and places a single transparent foil from a larger set of foils. This manual selection occurs until the last foil in the set has been displayed. The selection of foils may be dynamic with the presenter deciding to leave foils out of the presentation or skip sections of foils. The presenter typically speaks and interacts with the visual representation of each transparency on a screen.

Today, existing transparent plastic foils can be transformed into digital foils for use in a computer system. The textual and diagrammatic information is retained in the transformation process. It is also possible to create new and original digital foils directly in a computer system. Digital foils may also be supplemented with the addition of complex objects to include multimedia objects such as digital audio (voice, music, and sound effects), digital video, animation, and bitmap graphics (also known as multimedia components).

A portable computer coupled to a projection device, for example a PROXIMA® ColorWorks SX Model A502C True Color LCD projection panel, can deliver a digital foil presentation to a larger audience. A presentation panel simply diverts the contents of a display screen to another reception device like a screen on a wall in a conference room.

Improvements in computer memory, coupled with digital foil technology, can greatly increase the complexity (and usefulness) of foil presentations. A portable computer or notebook, for example the IBM® 750C ThinkPad®, may be used to hold several hundred digital foils for use in a live presentation. A number of different modules and sections could make up many different presentations, making the task of presenting much larger and more complex.

Gaining and providing dynamic access, in a non-linear sense, to a large set of digital foils is difficult, and is further complicated where the digital foils have complex multimedia objects.

For the purpose of this application, it should be understood that the term 'linear navigation" refers to sequential navigation permitting a single page up or down function. "Non-linear navigation" allows a presenter to redefine the presentation sequence of digital foils by permitting changes in flow between different modules, sections and units.

There are a number of problems associated with previous attempts at navigating digital foil presentations. Many software systems such as FreeLance®, Harvard Graphics®, and Slide Show from Asymetrix® Multimedia Toolbook provide a "screen show" capability which permits simple linear navigation between foils in a predefined sequence. The presenter cannot deviate from this sequence.

Other attempts provide popup dialog boxes which typically place a "table of contents" on a large portion of a display screen that is visible to the audience on the projection panel. This approach tends to distract the audience and disrupt the flow of the presentation. The presenter locates a pointer, either by keyboard command or by movement of a pointing device, over a symbol, word, or phrase in the table of contents to navigate to another display.

Hypertext and hypermedia systems also provide navigation with the placement of a pointer to activate a link. However, even lesser navigation distractions such as these are simply not acceptable for audience presentations because they typically take a great deal of time to operate accurately. This type of navigation system is more readily suited to a user privately viewing the content of a document and searching through unknown material.

In sharp contrast to a person searching for information, the presenter generally has in-depth knowledge of the substance of the presentation material and wants to scan quickly for a particular foil from a larger set of foils for greater flexibility during the act of presenting.

SUMMARY OF THE INVENTION

Retaining audience attention and reducing distractions during the delivery of a live presentation is paramount. As the ability to provide linear navigation and non-linear navigation is required, the non-linear navigation should permit a presenter to jump around within the presentation without computer generated distractions.

Therefore a primary object of the present invention is to provide a method and system for presenting and navigating digital foils, specifically a non-distracting on-screen indicator or monolith for use in navigating digital foils.

Another object of the present invention is to provide a navigation monolith having a visual indication of where a presenter is with respect to the sequence of the presentation.

Further objects of the present invention are to provide a navigation monolith having active functional areas in which a presenter may select and change the order of the digital foil presentation, and to provide a method to communicate with a navigation monolith having active functional areas wherein a presenter may select and change the order of the digital foil presentation.

Accordingly, the present invention provides a method of navigating a plurality of digital foils that includes the computer implemented steps of storing a first variable of a total number of the plurality of foils and a second variable of a currently displayed foil, displaying an indicator having a listing of at least a portion of the plurality of foils, incrementing or decrementing the second variable to correspond to a selected digital foil in response to user selection of one of said portion of the plurality of foils, and accessing and displaying the selected digital foil from the second variable.

The present invention also provides a navigator for random selection of digitized foils for display on a presentation medium in a presentation system. The navigator includes an on-screen indicator means identifying at least a portion of the digitized foils. The indicator means are adapted to be displayed within a narrow field on the presentation medium. The navigator also includes selection means for selecting a digitized foil from the digitized foils identified in the indicator means, and display means for retrieving and displaying the selected digitized foil. Preferably, the on-screen indicator is adapted to be displayed within a narrow field on a displayed digitized foil, and even to be displayed in a colour corresponding to a background colour of the displayed digitized foil.

Preferably, the navigator also includes means for retaining a pre-defined hierarchical presentation sequence of the digital foils, and the on-screen indicator has fields for listing each level of the hierarchical presentation sequence of said at least a portion of the digitized foils. The selection means would then preferably include means for incrementing and decrementing the fields for listing each level of the hierarchical presentation sequence in order to alter the portion of the digitized foils identified in the on-screen indicator.

The present invention is also directed to improvements in a presentation system that has memory means for holding digitized foils and means for displaying the digitized foils from the memory on a presentation medium. The improvements include sequencing means for grouping the digital foils into at least one presentation sequence, and navigation means for selecting digital foils for linear and non-linear display from said at least one presentation sequence that preferably has an on-screen indicator listing the digital foils in one presentation sequence.

BRIEF DESCRIPTION OF THE DRAWINGS

Embodiments of the invention will now be discussed in detail in association with the appended drawings, in which:

FIG. 8A being a flowchart of an Initialization Sequence and Wait for Event,

FIG. 8B being a flowchart of Wait For Event,

FIG. 8C being a flowchart of Foil Next event,

FIG. 8D being a flowchart of Foil Previous event,

FIG. 8E being a flowchart of Deactivate Navigation Monolith event,

FIG. 8F being a flowchart of Activate Navigation Monolith event,

FIG. 8G being a flowchart of Navigate Module event,

FIG. 8H being a flowchart of Navigate Section event, and

FIG. 8I being a flowchart of Navigate Unit event;

DETAILED DESCRIPTION OF THE PREFERRED EMBODIMENT

Figure 1:
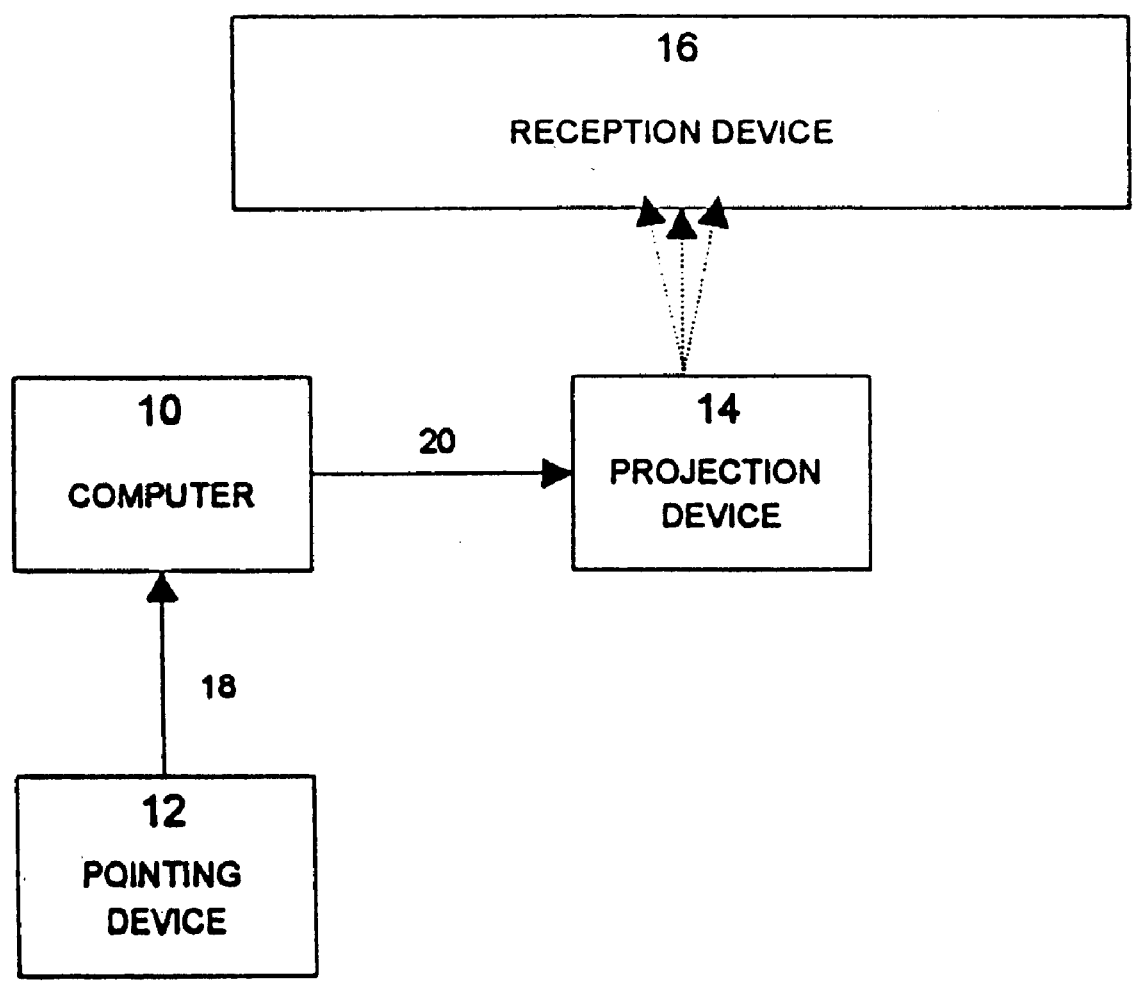
FIG. 1 is a block diagrammatic representation of a presentation system apparatus.

Referring to FIG. 1, a presentation system apparatus is shown in diagrammatic form. A computer system 10 is preferably a portable system such as an IBM ThinkPad 750C, although it may also be a stationary type of personal computer. A pointing device 12 is attached to the computer 10 through link 18. The pointing device 12 provides control of the system to the operator (presenter) and may be a mouse, trackball or IBM Track Point II® in-keyboard fingertip-manipulable pointing device. A projection device 14 interfaces to the computer 10 through link 20. The projection device may be an overhead LCD projection panel such as a PROXIMA Color Works SX Model A502C or an external BARCO RGB television projector. The projection device projects an image onto a reception device 16, such as a screen, white board, or wall.

Figure 2:
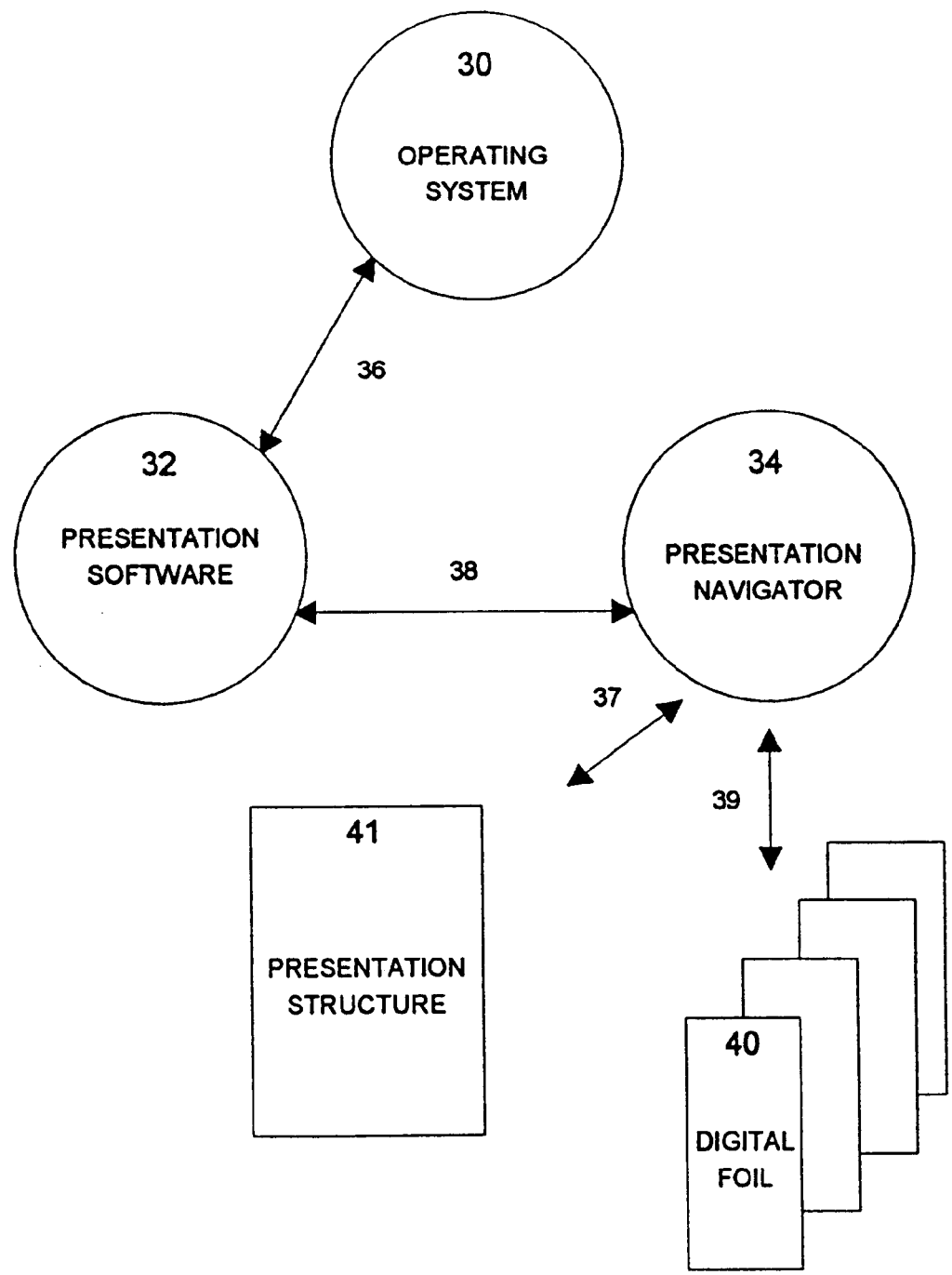
FIG. 2 is a block diagrammatic representation of a presentation system software including a presentation navigator.

Referring now to FIG. 2, the presentation system software will be described. An operating system 30 resides in the computer 10 of FIG. 1 and performs well known system functions. Presentation software 32 also resides in the computer 10 and communicates with the operating system 30 at 36. Examples of presentation software include, but are not limited to, Lotus Freelance, Harvard Graphics, Asymetrix Multimedia Toolbook and Asymetrix Compel. The last two computer programs are known in the art as authoring systems but also have slide show capability.

A presentation navigator 34 resides in the computer 10 as an interface and communicates through first link 38 with the presentation software 32, through second link 37 with a presentation structure 41 and through third link 39 with a set of digital foils 40. The presentation structure 41 provides a predefined structure for the presentation and defines the navigation links for manual selection by a presenter from the plurality of presentation digital foils 40.

Figure 3A:
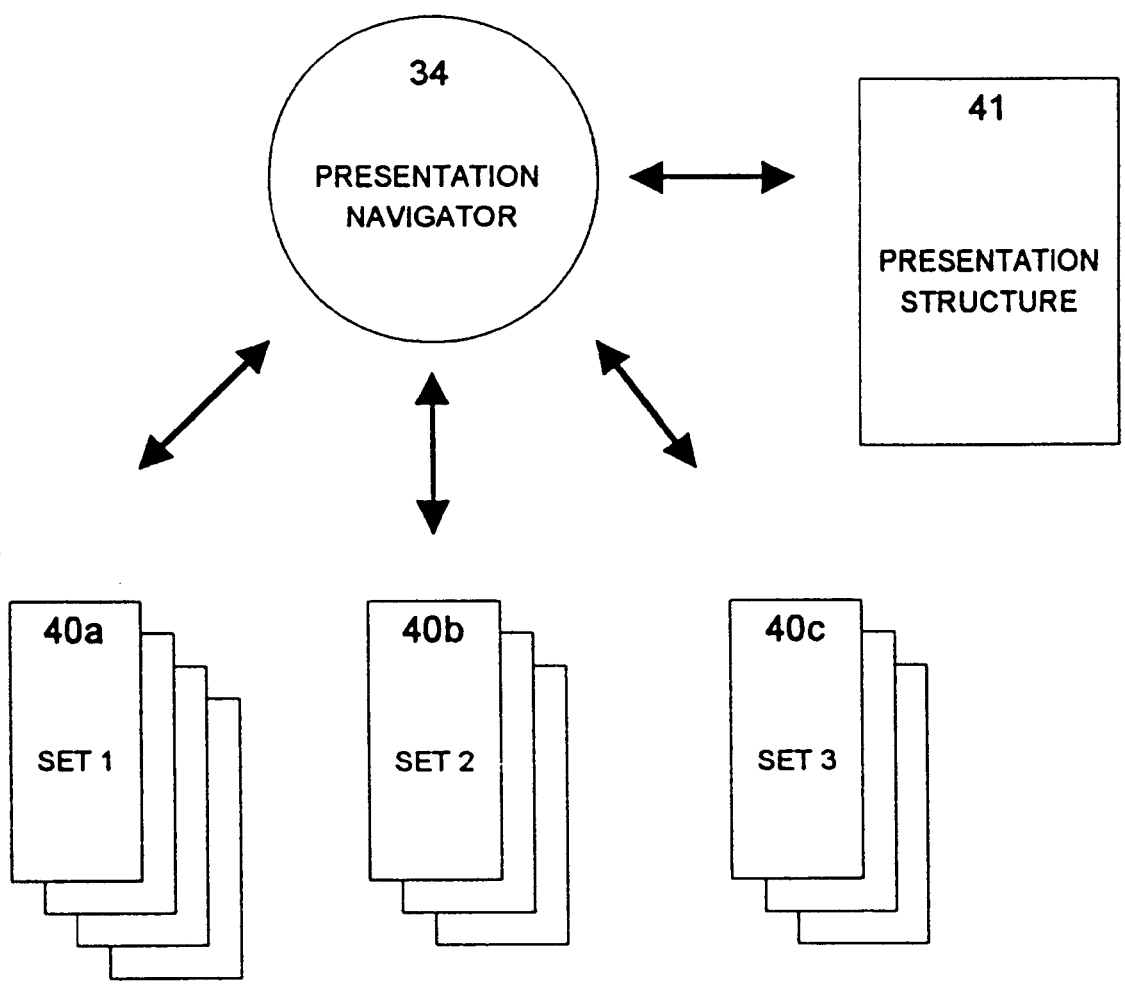
FIG. 3A is a schematic diagram of a navigator having access to multiple digital foils, according to the present invention.

Referring now to FIG. 3A, the presentation navigator 34 is shown interacting with a presentation structure 41 and a number of presentation data sets 40a, 40b and 40c in a schematic representation. Each presentation data set is defined as a modules and may contain a plurality of sections and units each having digital foils.

Figure 3B:
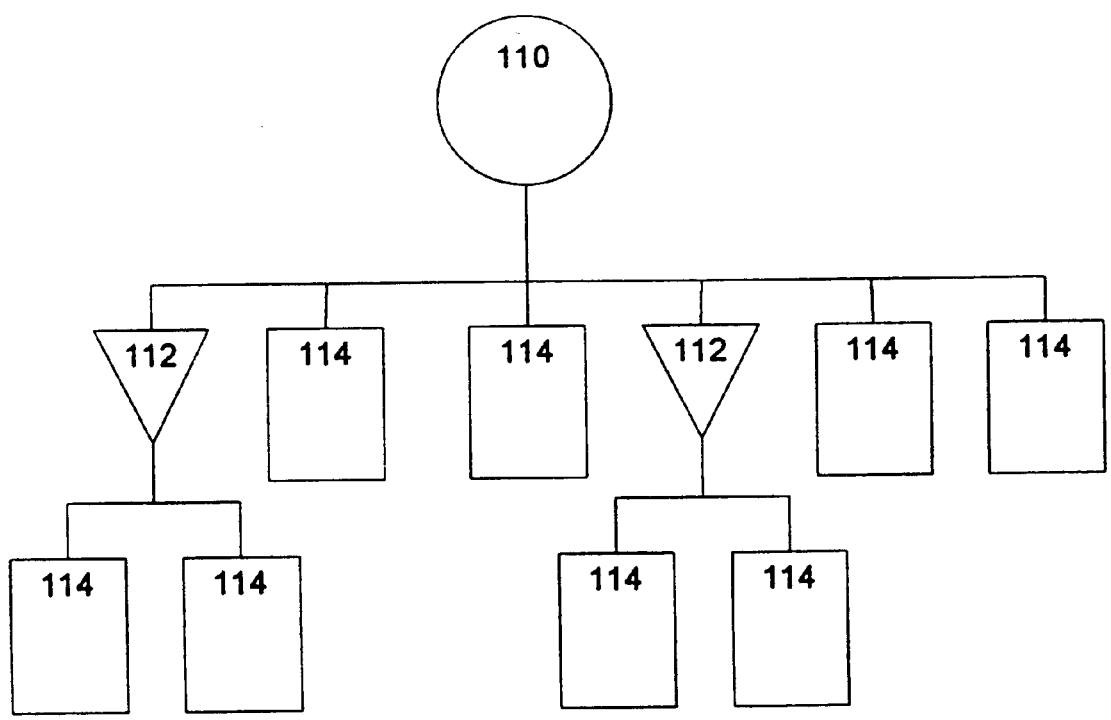
FIG. 3B is a diagram of a presentation structure for use with a set of digital foils.

In FIG. 3B a hierarchical presentation structure as defined by a presenter is schematically illustrated. A complete module structure is defined as having two sections 112 and eight presentation units 114. The presentation structure 41 of FIG. 3A defines the predefined display sequence and range of permissible navigation.

To work with the schematic structure of FIG. 3B, three functional types of navigation, adapted to the hierarchy of the presentation structure, are provided to the presenter in the present invention:

1. The navigator must provide presentation navigation to the specific module 110 and other modules in the case where other modules exist. This is defined in the present application as "module navigation".
2. There are also 2 sections 112 that each contain a sequence of digital foil units defined within the module 110. To permit a presenter to move around sections and even skip a section and every unit in that section, "section navigation" is provided.
3. To permit a presenter to skip around in the sequence of the digital foils at the unit level and perhaps skip a few digital foils, "skip navigation" is defined.

Figure 3C:
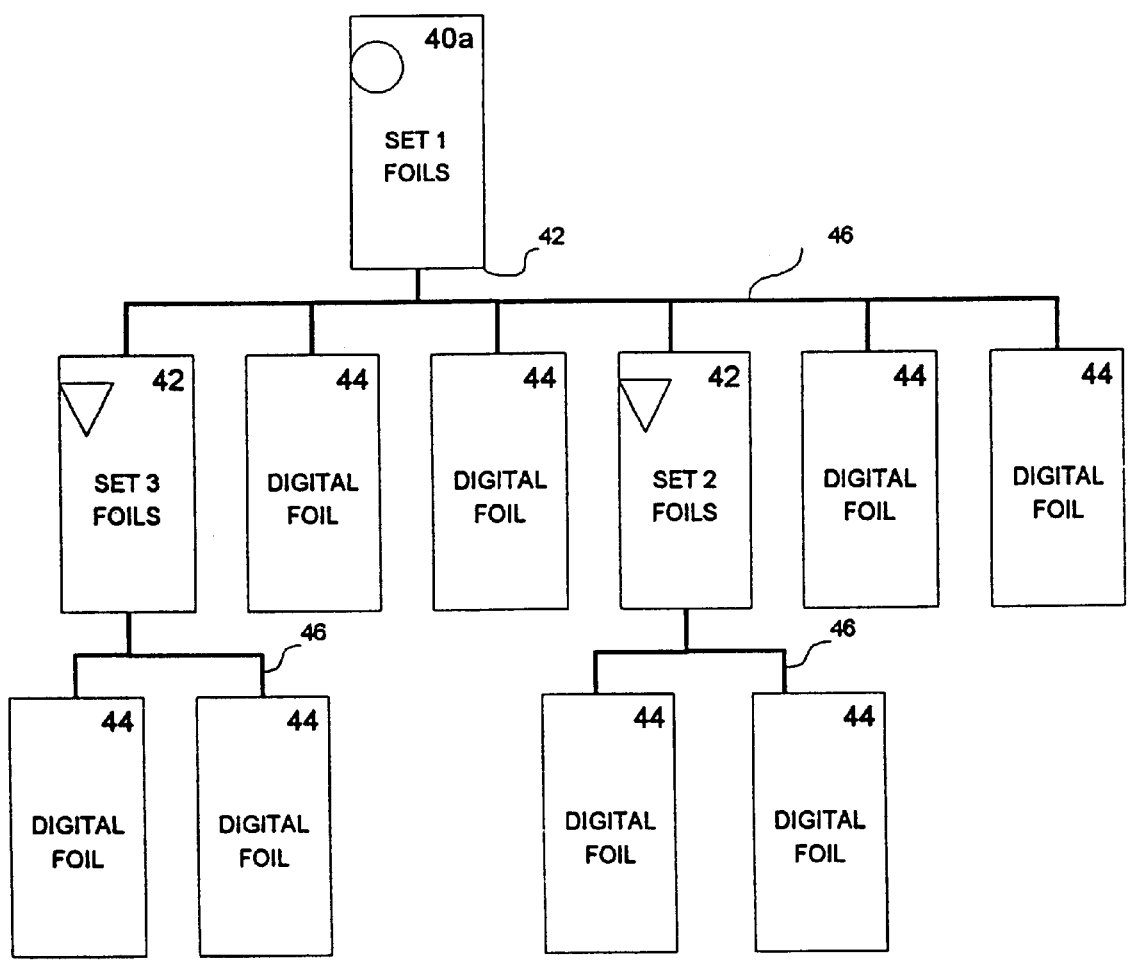
FIG. 3C is a diagram of a single presentation following the structure of FIG. 3B in combination with digital foils from FIG. 3A.

The result of combining the presentation structure of FIG. 3B with the sets of digital foils of FIG. 3A yields the schematic diagram of FIG. 3C. In FIG. 3C, the presenter has defined a module and has selected presentation data set number 1 (40a) for review with an audience. As a backup and depending on questions posed by members of the audience, the presenter has included digital foil set numbers 2 and 3, that are now defined under a separate section 42.

The presentation navigator of the present invention permits predefined linear navigation of digital foil set number 1 (40a) and dynamic non-linear navigation access to the remaining digital foils (40b and 40c) from within the three data sets.

Figure 4:
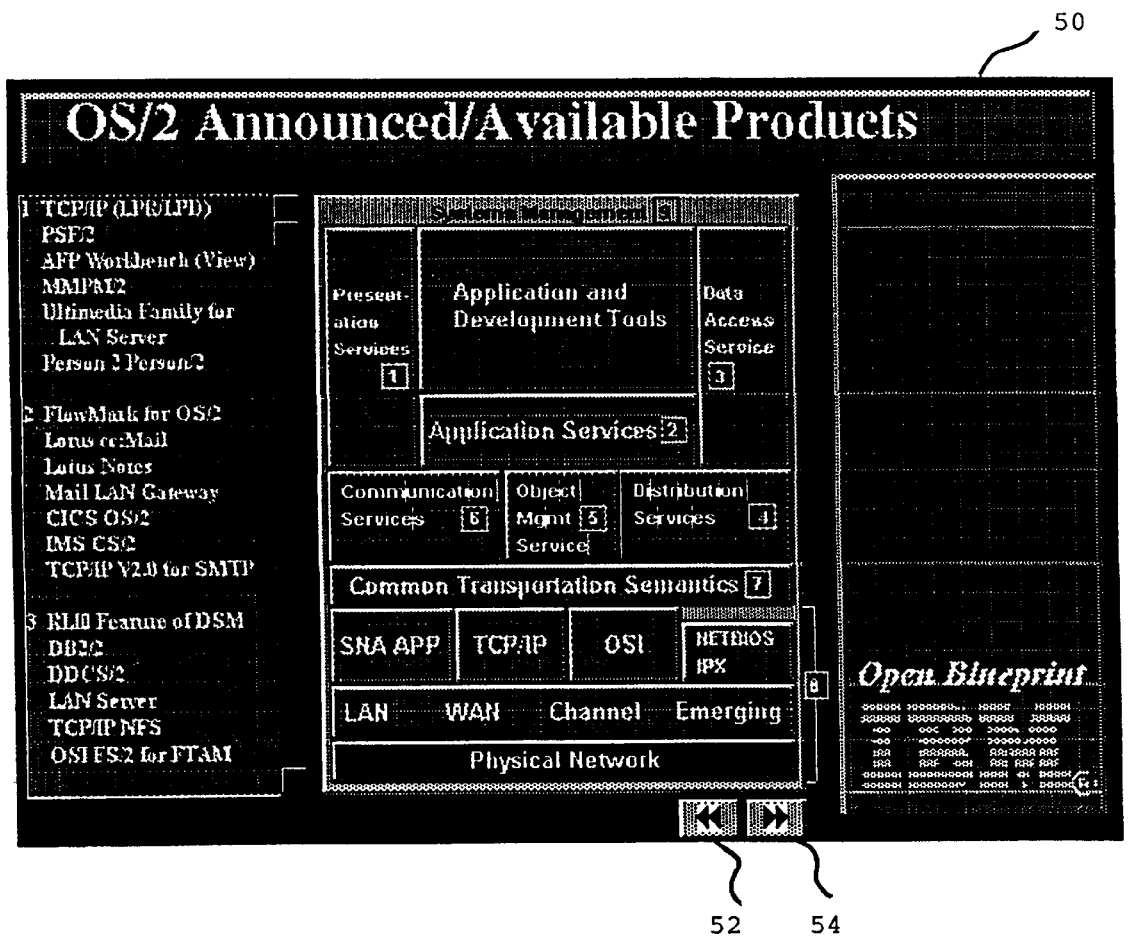
FIG. 4 is an example of a displayed digital foil showing access to linear navigation capability.

An example of a digital foil 50 is shown in FIG. 4 enabled with default linear navigation means. Using a pointing device or keyboard, the presenter can activate the scrolling arrows to move the foil up (in the case of arrow 54) or down (in the case of arrow 52). The scrolling arrows 52 and 54 provide linear movement of one foil within the presentation; pointing device access is through placement of a pointer with a button click to activate navigation and keyboard access is through a keystroke, such as the left and right cursor keys.

Figure 5:
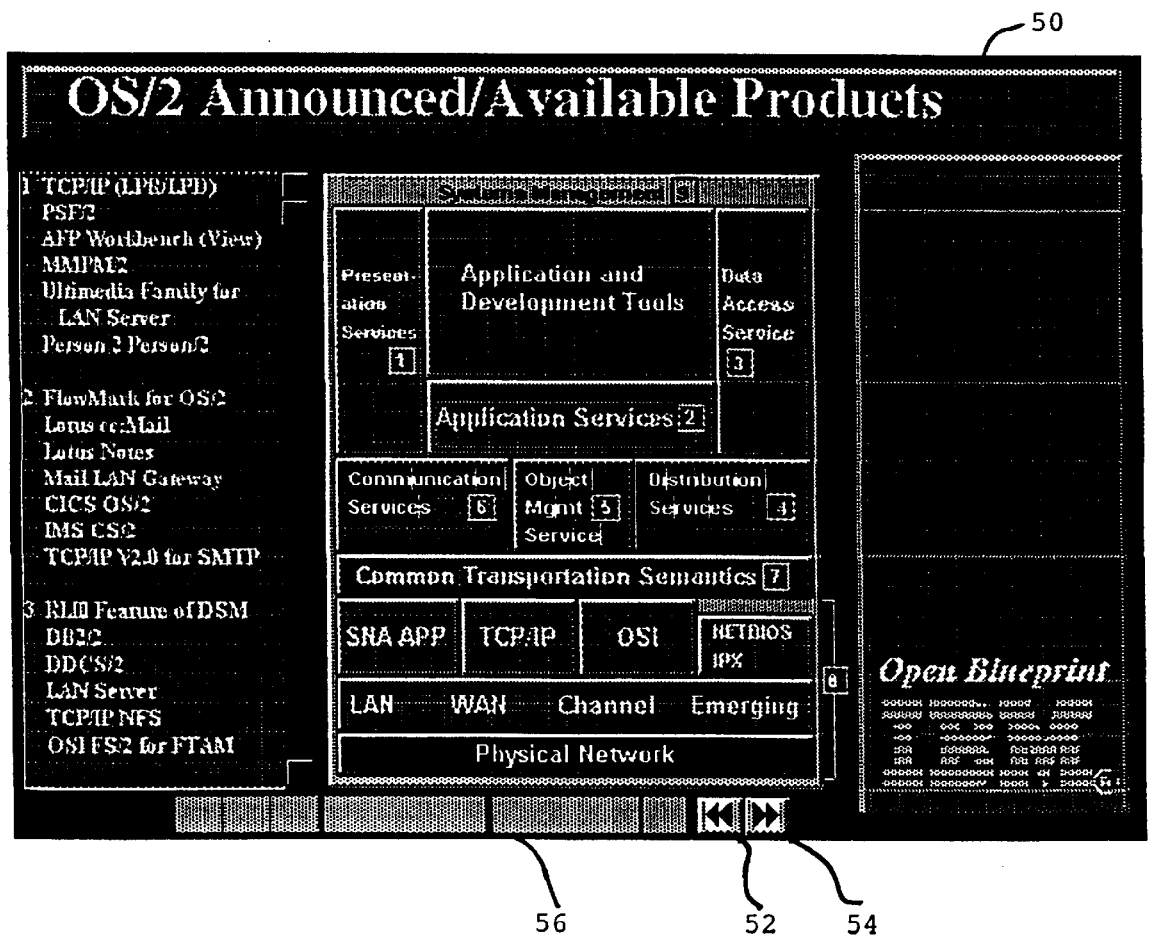
FIG. 5 is an example of a displayed digital foil showing access to non-linear navigation capability.

The digital foil 50 is also shown in FIG. 5 enabled, in this figure, with a non-linear navigator indicator or monolith 56 according to the invention. In the preferred embodiment, the monolith 56 has a default state of hidden and may be shown or activated on the display by either a keyboard command or dragging a pointer functionally connected to a pointing device into a predefined area, preferably at the bottom of the display screen. According to one embodiment of the invention, the colour and composition of the monolith 56 should be such to blend in with the background color of the digital foil in order to prevent distracting the audience. In an alternative embodiment, the bottom area of all digital foils where the monolith 56 would appear may be permanently obscured from audience view by the presentation panel, so that the monolith is only visible to the presenter working at the computer.

Figure 6A:
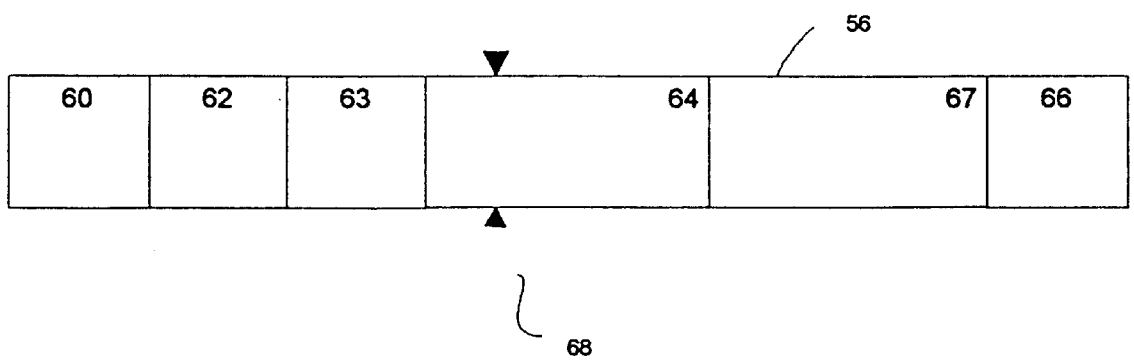
FIG. 6A is a view of a navigator monolith.
Figure 6B:
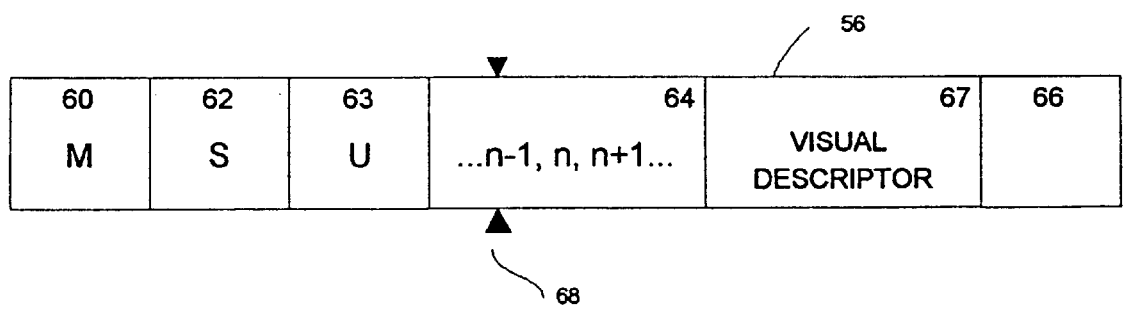
FIG. 6B is a view of the navigator monolith showing active presentation indicators.

When the presenter has placed a pointer into an active area on the display screen, the navigator monolith 56 appears with structural indicators 60, 62, and 63 and visual indicators 64 and 67, as illustrated in FIGS. 6A and 6B.

The first structural indicator is a module indicator 60 that activates and illustrates the current module and the range of other modules, and permits module navigation to other modules within the presentation (module navigation).

The second structural indicator is a section indicator 62 that activates and illustrates the current section and the range of other sections, and permits section navigation to other sections within the module (section navigation).

The third structural indicator area is a unit indicator 64 that activates and illustrates the current unit and the range of other units, and permits unit navigation to other units within the module (skip navigation).

A sequence indicator 64 provides the list of navigatable digital foils within the unit, and in one embodiment, the current digital foil for the structural indicators is visually indicated by a marker 68 located on the sequence indicator 64. In alternative embodiments, a visual highlight or change in shape or change in colour may be applied within the digital foil list to indicate the current digital foil.

The second visual indicator in the navigation monolith is a detail indicator 67 that provides a short description of either a module, section or foil to assist a presenter in finding a particular foil.

In addition to the foregoing, an activate detail search button 66 is provided to assist a presenter who cannot find a particular foil. The search button is analogous to a help button, but the context of the help is a list of all modules, sections, and foils. Use of the search button, while generating a slight visual distraction to the audience, provides the presenter with complete access to all of the digital foils, even where the presenter has not fully prepared for the presentation.

Referring specifically to FIG. 6B, an example list of symbols is located within five of the six functional areas. The choice of visual indicator may be text, numbers, a combination of text and numbers, or symbols. In the illustrated example, the current presentation is in module 'M', section 'S', unit 'U' on digital foil 'n' with skip navigation to foil ' . . . n−1,n,n+1 . . . '. If the presenter locates the pointer over the module indicator 60, then the sequence indicator 64 and detail indicator 67 will reflect information about module. If the presenter locates the pointer over the section indicator 62, then the sequence indicator 64 and detail indicator 67 will provide the section information. Finally, if the presenter locates the pointer over the unit indicator 68, then the sequence indicator 64 and detail indicator 67 will provide the unit information. In the case of a multimedia presentation, the visual indicator 67 may be designed to indicate the presence and type of compound object.

After the presenter makes all the desired selections, either moving the pointer out of the active zone on the display or alternately activating a keystroke or button click hides the monolith 56 and activates the changes to the sequence of the presentation.

Figure 7:
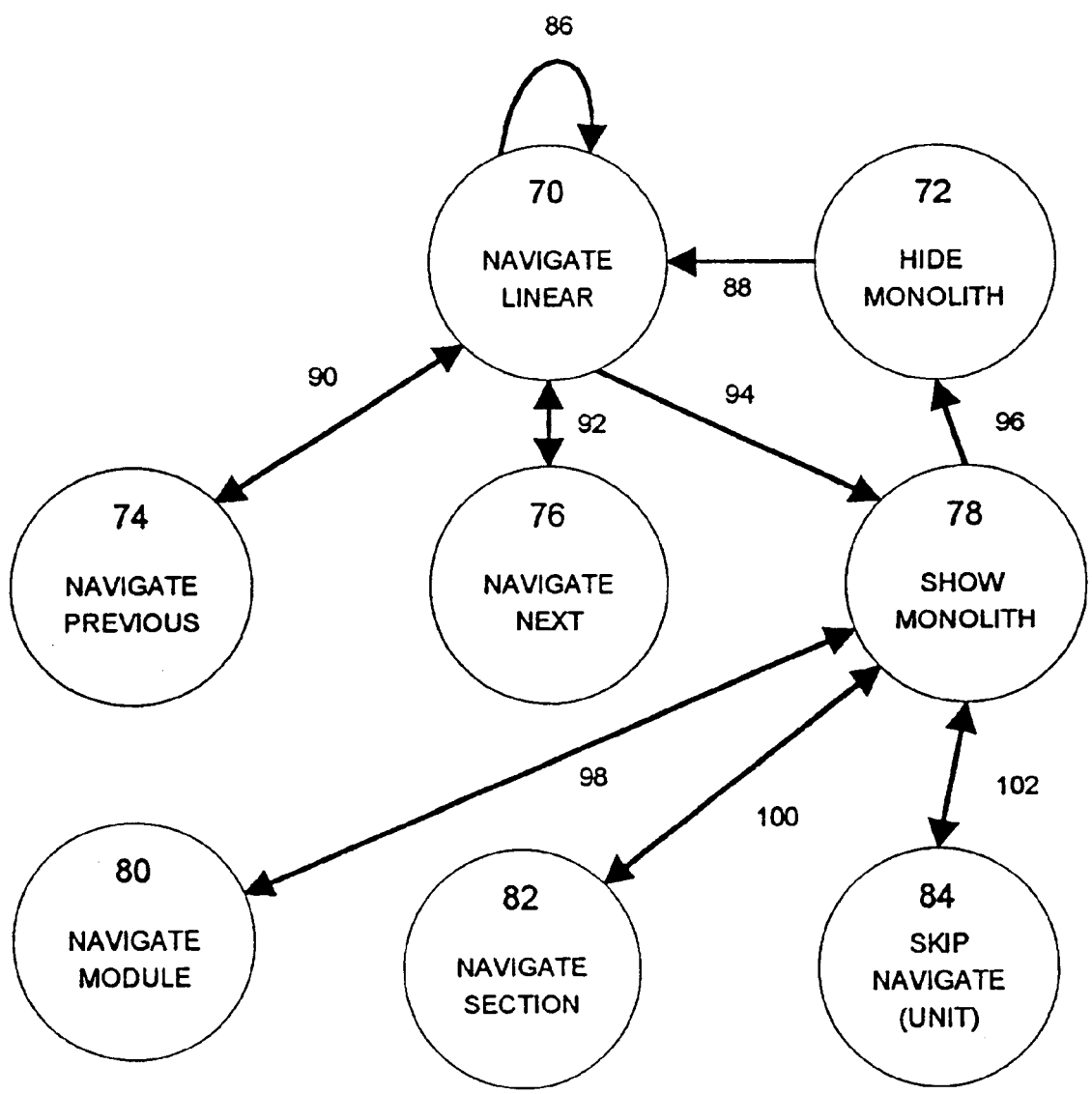
FIG. 7 is a state graph representation of the navigator logic.

The method logic and flow in association with the navigation monolith, and more specifically each functional area of the monolith, are described with reference to FIG. 7, which illustrates a state graph representation of the method. Each circle represents a state of the presentation navigator. The arrows indicate the state sequence with the exception of arrow 86 which denotes the initial and idle state. The arrows provide for state transitions depending on a defined event that permits a transition.

The logic of the navigator is shown starting at the initial state of navigate linear 70. In this state, the presenter has access to linear navigation. Linear navigation provides two states. The navigate previous state 74 may be accessed 90 from the linear state 70 by either a point and click operation on button 52 of FIG. 4 or a keystroke operation. The navigate next state 76 may be accessed 92 from the linear state 70 by either a point and click operation on button 54 of FIG. 4 or a keystroke operation. Either linear navigation state provides a single digital foil movement from the currently displayed digital foil (i.e., one foil up or one foil down in the pre-established sequence).

The presenter may optionally activate non-linear navigation from the navigate linear state 70 at 94.

To activate non-linear navigation, the show monolith state 78 is accessed 94 from the navigate linear state 70. As discussed above, the show monolith state is accessed by keyboard entry, by placing a pointer at a predefined location, or by point and click as controlled by a pointing device. The navigation monolith 56 as shown in FIG. 5 is visible and operational in this state.

The show monolith state 78 provides access to three non-linear navigation states. The navigate module state 80 may be accessed 98 to provide the presenter with the ability to move between various modules in a presentation. It can be accessed by placing a pointer over the module indicator 60 of FIG. 6A or, optionally, by a keystroke sequence, and permits communication with the module indicator 60. Module selection may be made, for example, by clicking the left mouse button for module down and clicking the right mouse button for module up when a pointer is over the module indicator 60. When a presenter has completed module selection, control is transferred back to the show monolith state 78. The monolith provides visual feedback to the presenter with the sequence indicator 64 and detail indicator 67 which are updated as a result of the module change.

The navigate section state 82 may be accessed 100 to provide the presenter with the ability to move to another section within a module. It is accessed by placing a pointer over the section indicator 62 of FIG. 6A, or optionally, by keystroke sequence, and permits communication with the section indicator 62. Section selection may be made, for example, by clicking the left mouse button for module down and clicking the right mouse button for module up when a pointer is over the section indicator 62. When a presenter has completed section selection, control is returned back to the show monolith state 78. The monolith provides visual feedback to the presenter with the sequence indicator 64 and detail indicator 67 which are updated as a result of the section change.

The navigate skip state 84 may be accessed 102 to provide the presenter with the ability to proceed non-sequentially through a set of digital foils. It is accessed by placing a pointer over the unit indicator 63 of FIG. 6A or, optionally, by keystroke sequence and permits communication the unit indicator 63. Unit selection may be made, for example, by clicking the left mouse button for module down and clicking the right mouse button for module up when a pointer is over the unit indicator 63. When the presenter has completed unit selection, control is returned back to the show monolith state 78. The monolith provides visual feedback to the presenter with the sequence indicator 64 and detail indicator 67.

Once the presenter indicates monolith selection is complete by moving the pointer out of a predefined area, by pointing and clicking or by keystroke entry, the show monolith state 78 updates the digital foil and display order sequence and transfers 96 to the hide monolith state 72 which in turn transfers 88 control back to the navigate linear state 70. Resumption of the presentation by the presenter continues with an updated display of the new digital foil.

Figure 8A:
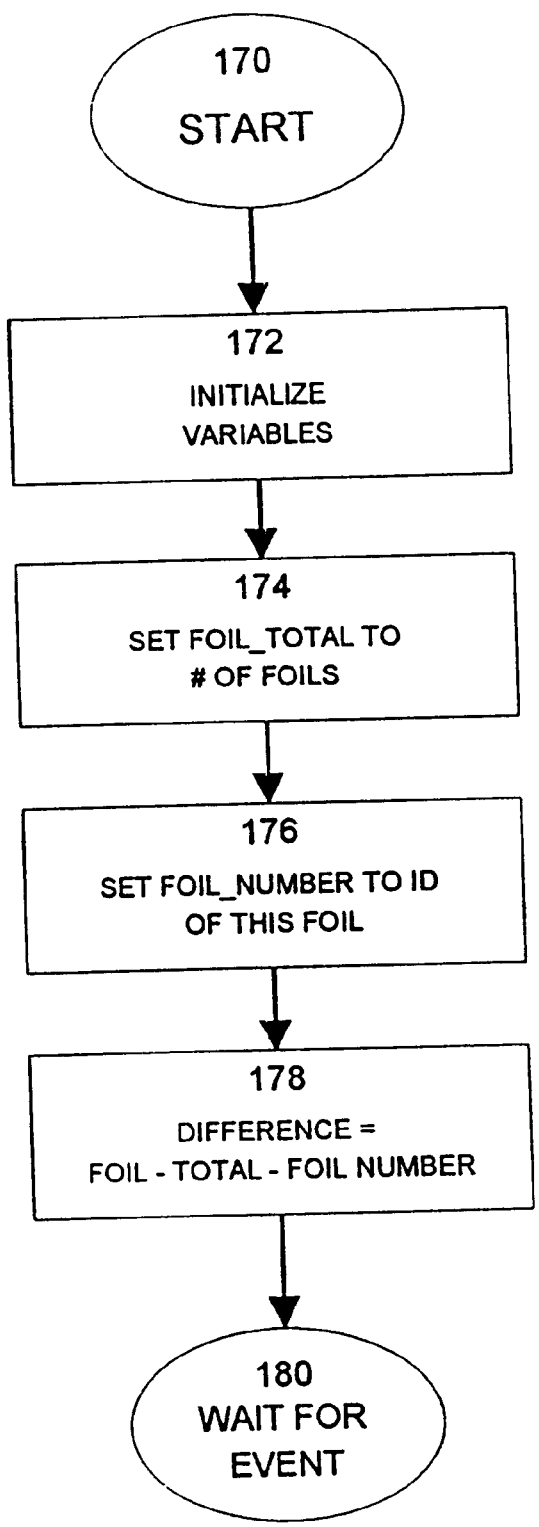
FIGS. 8A through 8I are flow diagrams illustrating the following aspects of the embodied method.

In FIG. 8A, an initialization sequence which transfers control to a wait for event routine is described starting at block 170. System variables are initialized (block 172) to establish access to the required data sets. This would include setting up pointers to the structure file and individual digital foils and setting temporary variables to zero. The total number of foils is then placed into a variable (block 174). This variable is used throughout various routines in determining a navigation end point. The current page number of the first digital foil is also placed into a variable (block 176) that will be updated as navigation progresses to keep a record the currently displayed digital foil. Finally, a difference variable is established (block 178) for later navigation parameters.

Figure 8B:
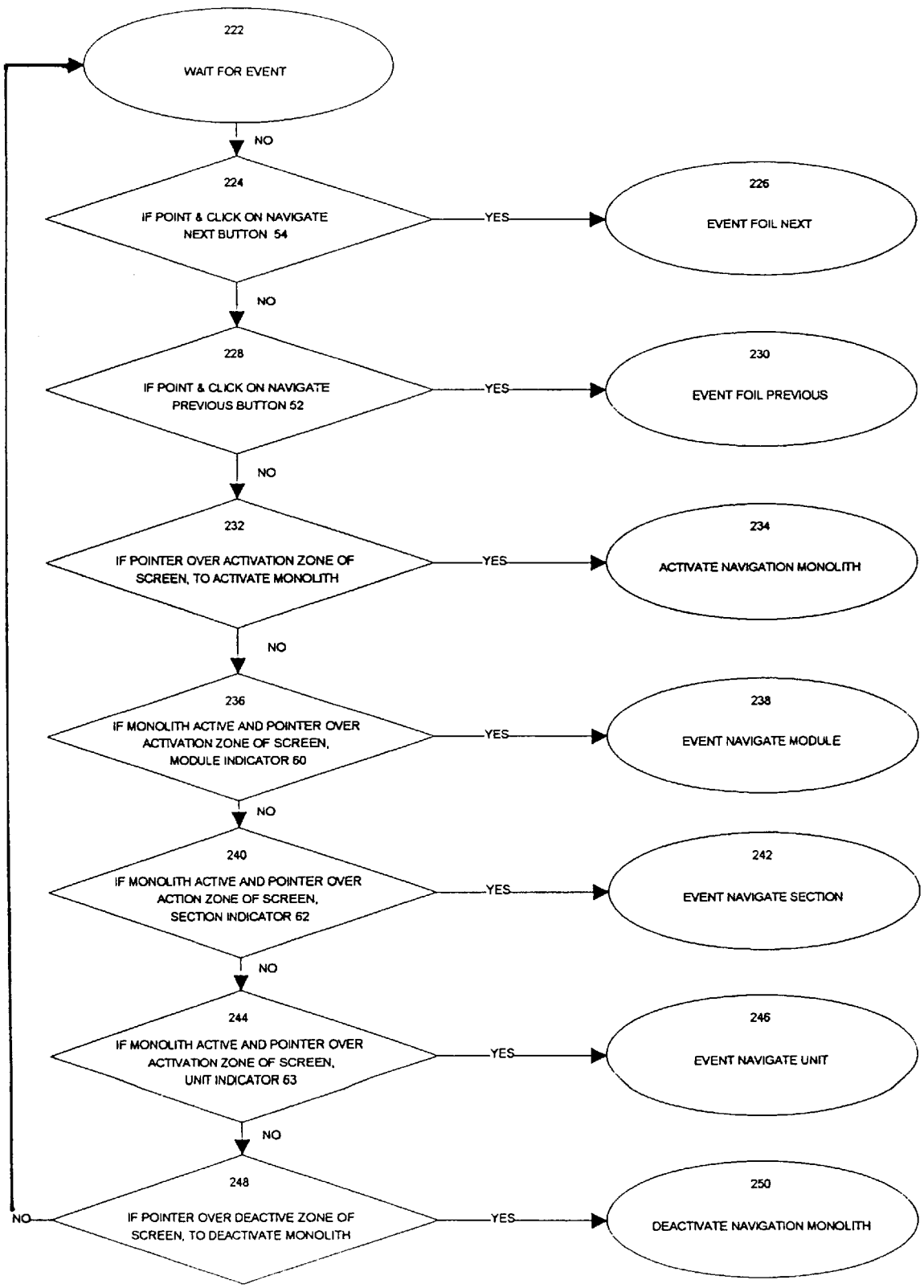

In FIG. 8B, the wait for event sequence is described starting at block 222. First, a check is made for linear navigation (block 224). If a point and click action on button 54 of FIG. 4 by the presenter operating a pointing device is received, control is passed to foil next event (block 226). A second check is made for linear navigation (block 228). If a point and click action on button 52 of FIG. 4 by the presenter operating a pointing device is found, then control is passed to the foil previous event (block 230). A check is then made for pointer location (block 232). If the pointer is placed by the presenter over an activation zone of the display screen for activation of the navigation monolith, then control is passed to the activate navigation monolith (block 234). A fourth check is made for module navigation (block 236). If the navigation monolith is active and the pointer is placed by the presenter over the module indicator 60 of FIG. 6A, then control is passed to the event navigate module (block 238). A fifth check is made for section navigation (block 240). If the navigation monolith is active and the pointer is placed by the presenter over the section indicator 62 of FIG. 6A, then control is passed to the event navigate section (block 242). A sixth check is made for skip navigation (block 244). If the navigation monolith is active and the pointer is placed by the presenter over the unit indicator 63 of FIG. 6A, then control is passed to the event navigate unit (block 246). Finally, a check is made to determine if the pointer is placed over a deactivate navigation monolith zone (block 248). If the navigation monolith is active and the pointer is over a predefined zone on the display screen, control is passed to the deactivate navigation monolith (block 250). This sequence of checks continuously repeats itself while the presentation system is in operation.

Figure 8C:
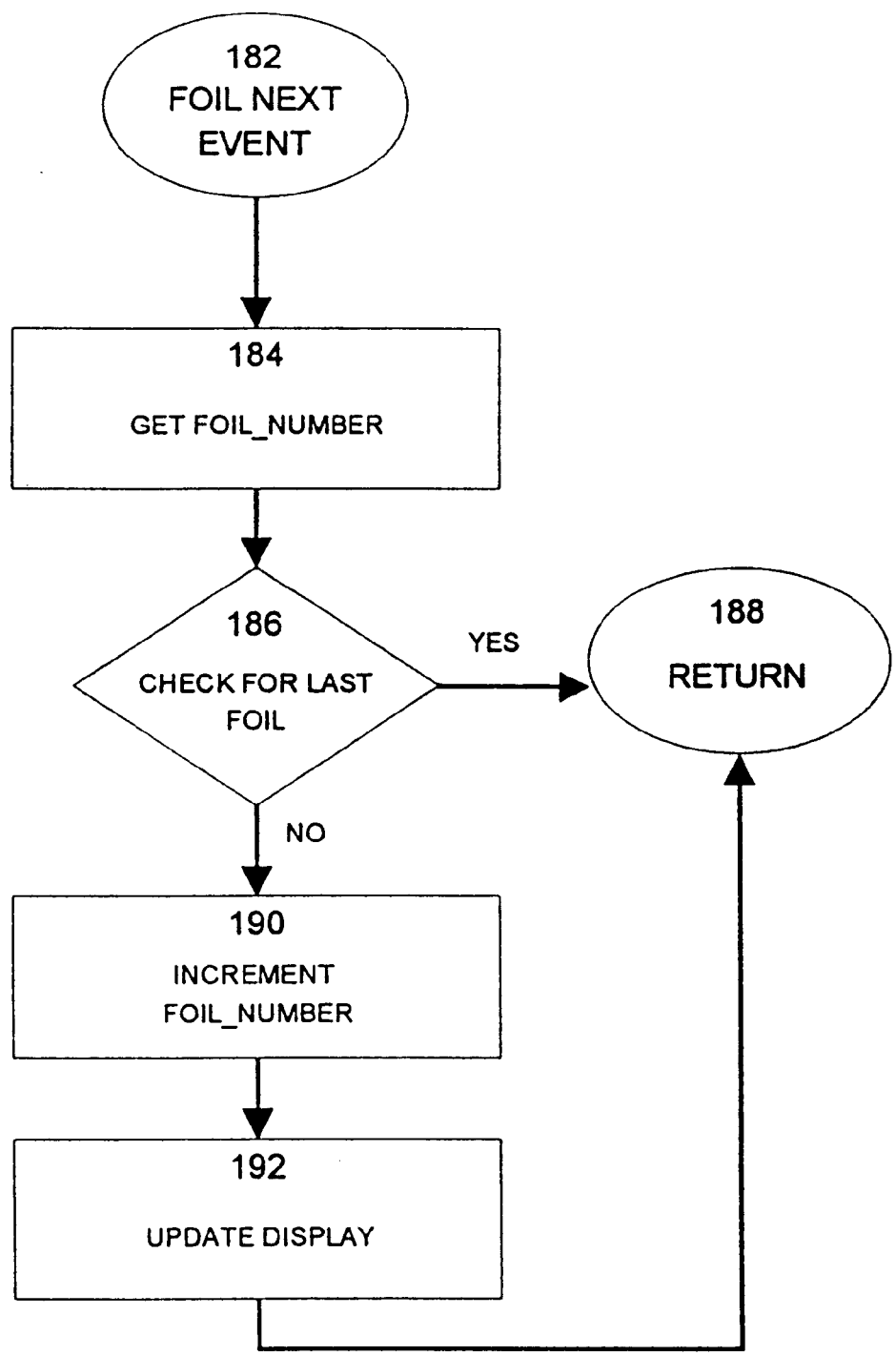

In FIG. 8C, foil next event starting at block 182 is described. The first step in the process is to get the current foil number and place it into a variable (block 184). Then a check is made for the last foil (block 186) to determine if there is another foil to navigate to in the series. This check determines if the last foil in the current presentation has been reached. If the foil number is the last foil, then a return is executed (block 188) and control is passed back to the wait for event (block 222 of FIG. 8B) routine. If the foil number is not the last foil, then the foil number is incremented (block 190) followed by a display update of the new digital foil (block 192) and a return (block 188) to wait for event (block 222).

Figure 8D:
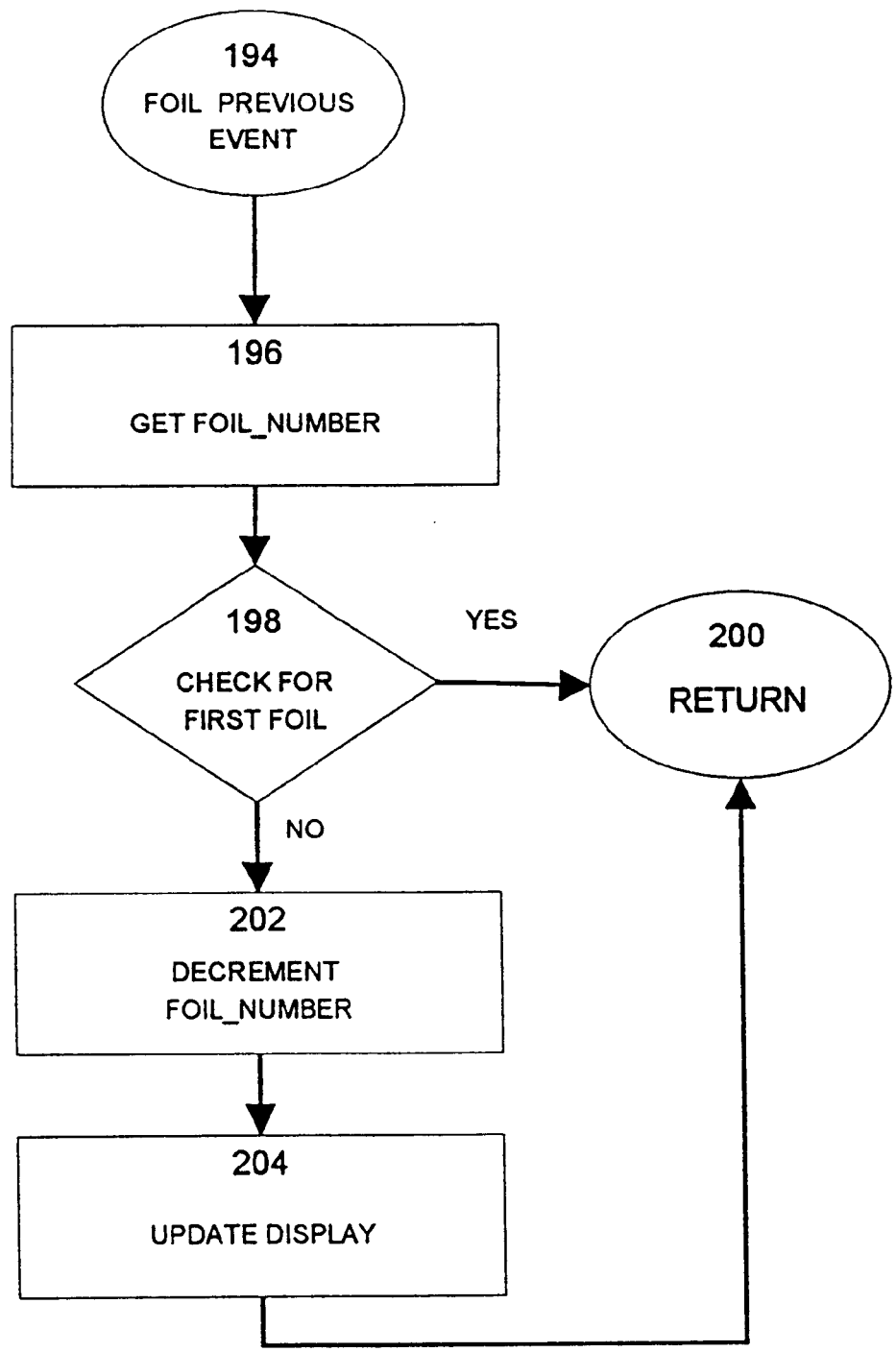

In FIG. 8D, foil previous event starting at block 194 is described. The first step in the process is to get the current foil number (block 196) and place it into a variable. Then a check is made for the first foil (block 198) to determine if there is another foil to navigate to in the series. This check determines if the first foil in the current presentation has been reached. If the foil number is the first foil, then a return is executed (block 200) and control is passed back to the wait for event (block 222 of FIG. 8B) routine. If the foil number is not the first foil, then the foil number is decremented (block 202) followed by a display update of the new digital foil (block 204) and a return (block 200) to the wait for event (block 222) module.

Figure 8E:
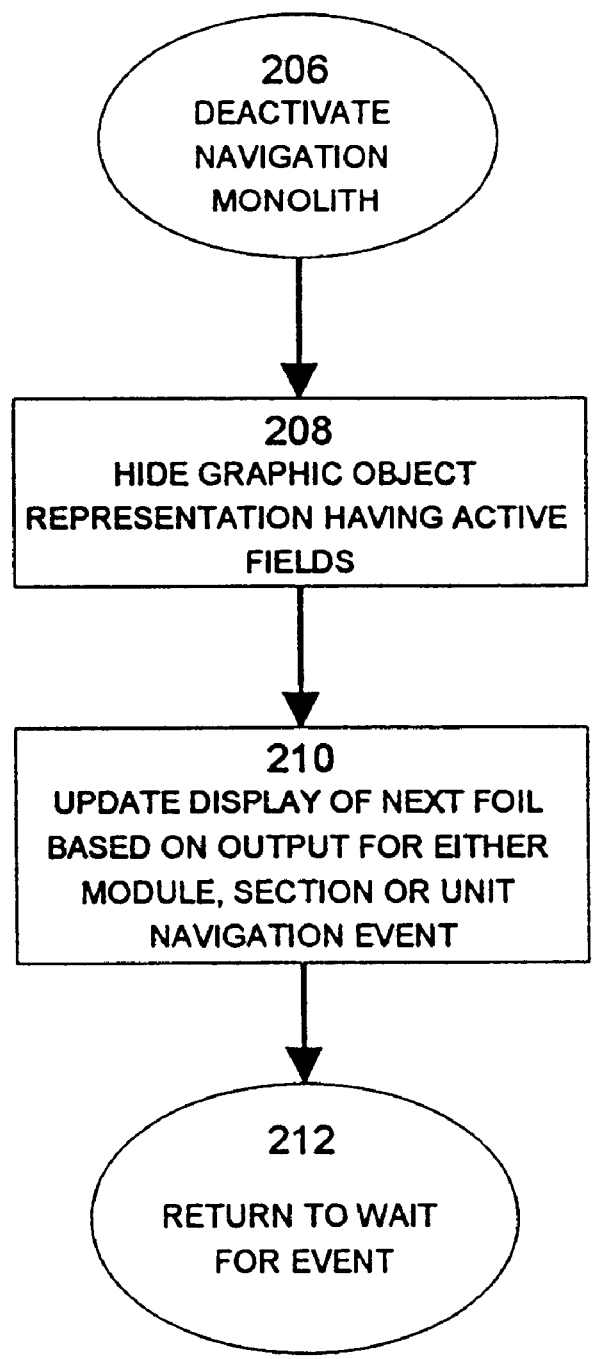

In FIG. 8E, deactivate navigation monolith starting at block 206 is described. The graphic object representation of the navigation indicator or monolith with active fields is hidden (block 208). The display screen is then updated with the next digital foil based on output from one, or a combination, of navigation events to include module, section, or skip, that is, unit (block 210). Control is then passed back (block 212) to wait for event (block 222 of FIG. 8B).

Figure 8F:
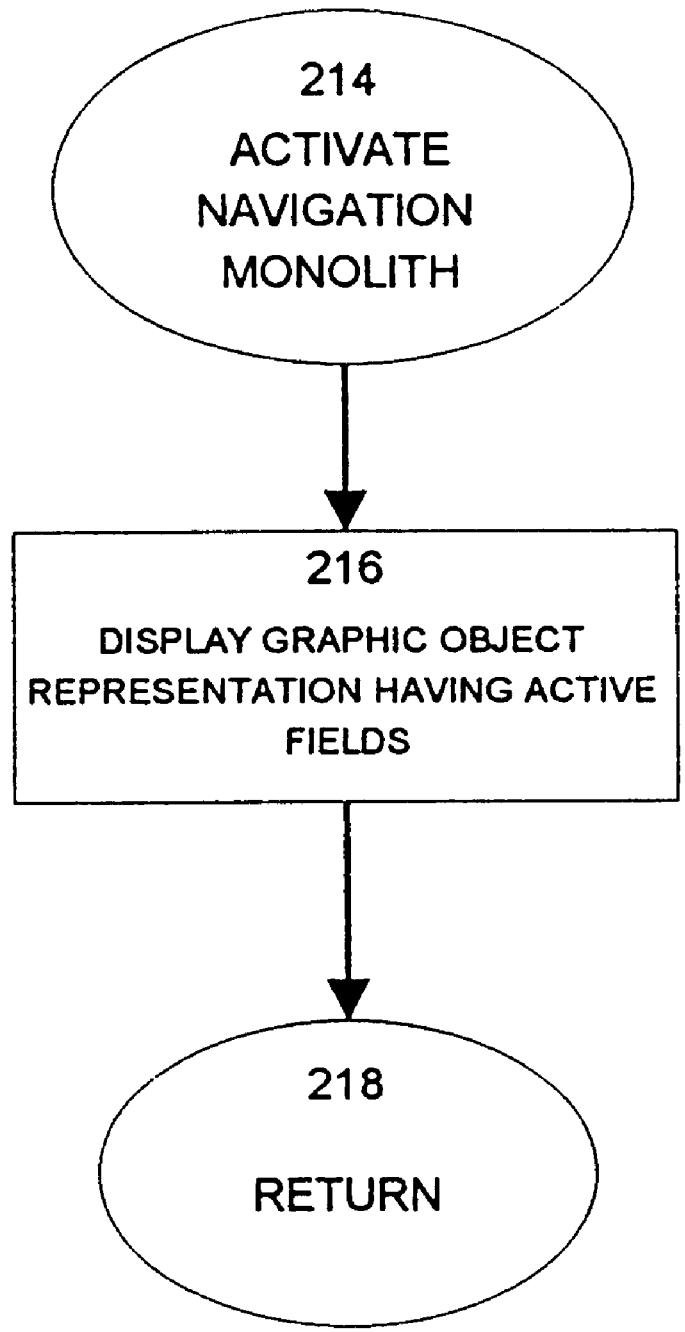

In FIG. 8F, activate navigation monolith (block 214) is described. The graphic object representation of the navigation monolith with active fields is shown at block 216. The active fields are filled with module, section, and unit information. The current digital foil parameters such as foil number and visual descriptor are also respectively placed in the detail indicator 67 and sequence indicator 64 as shown in FIG. 6A.

Figure 8G:
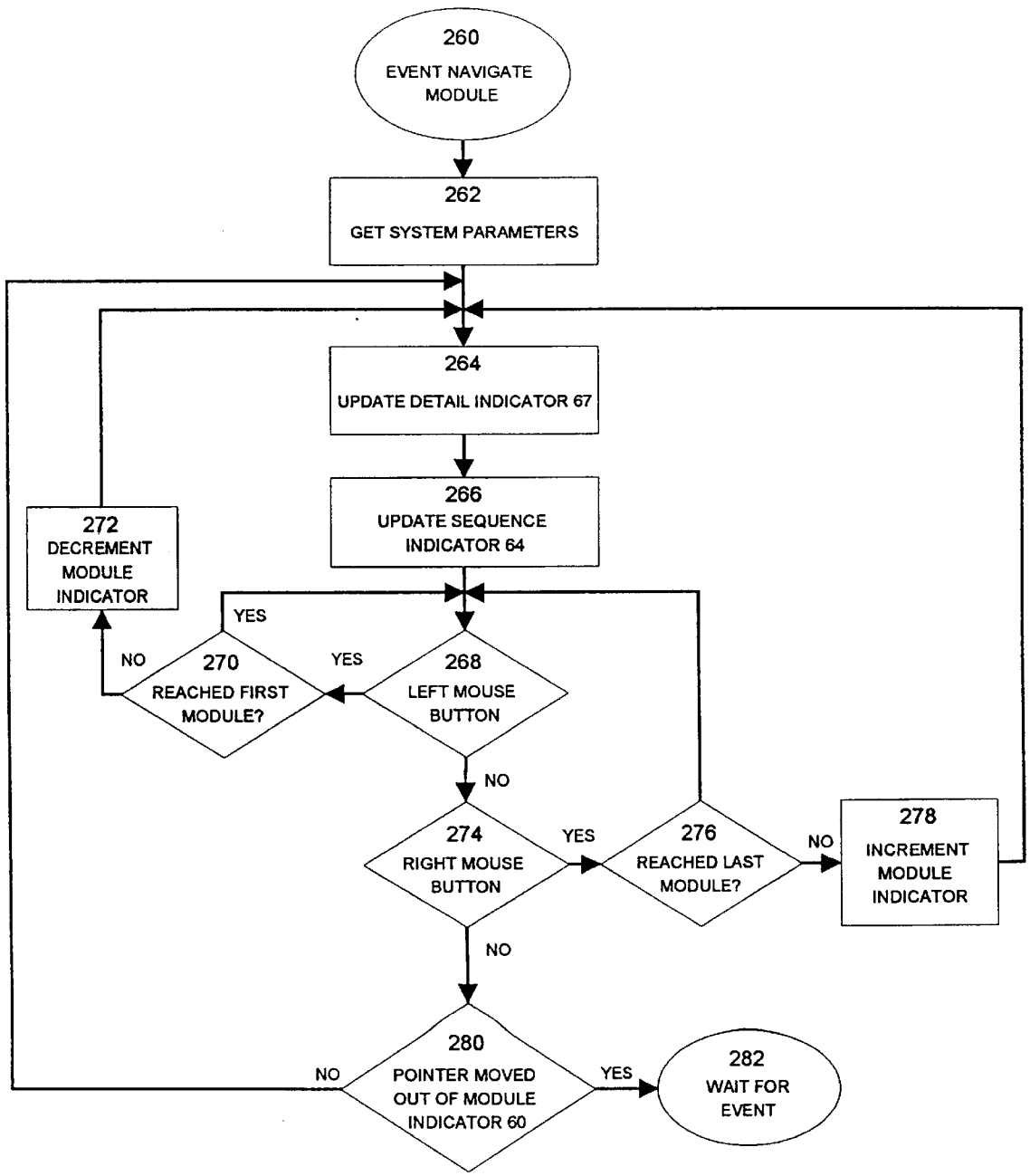

In FIG. 8G, event navigate module (block 260) is described. The navigation monolith must be active before entering this routine and a pointer has been placed over the module indicator 60 of the monolith 56. The system parameters are obtained (block 262), including the current digital foil number, permissible range of navigation, and structure information. The detail indicator 67 from FIG. 6A is updated (block 264) to reflect the title of the current digital foil. Then the sequence indicator 64 from FIG. 6A is updated (block 266) to indicate to the presenter the current digital foil. A check is made for use of the left mouse button (block 268). The left mouse button navigates to previous modules one click at a time. If the left mouse button has been clicked by a presenter, a check is made (block 270) to determine if the first module in the presentation has been reached. If the first module has been reached, then no further navigation is possible and loop is made back to block 268. If the first module has not been reached, then the module indicator is decremented (block 272) and control is looped back to enter the first of two updates (block 264).

Continuing now from decision block 268, another check is made, this time for use of the right mouse button (block 274). The right mouse button navigates to next modules one click at a time. If the right mouse button has been clicked by a presenter, a check is made (block 276) to determine if the last module in the presentation has been reached. If the last module has been reached, then no further navigation is possible and control loops back to block 268. If the last module has not been reached, then the module indicator is incremented (block 278) and control is looped back to enter the first of two updates again (block 264).

A final check is made to determine if the pointer has been moved by a presenter out of the module indicator 60 area (block 280). If it has not been moved, then control is returned back (block 264); otherwise control is passed back to wait for event (block 282).

Figure 8H:
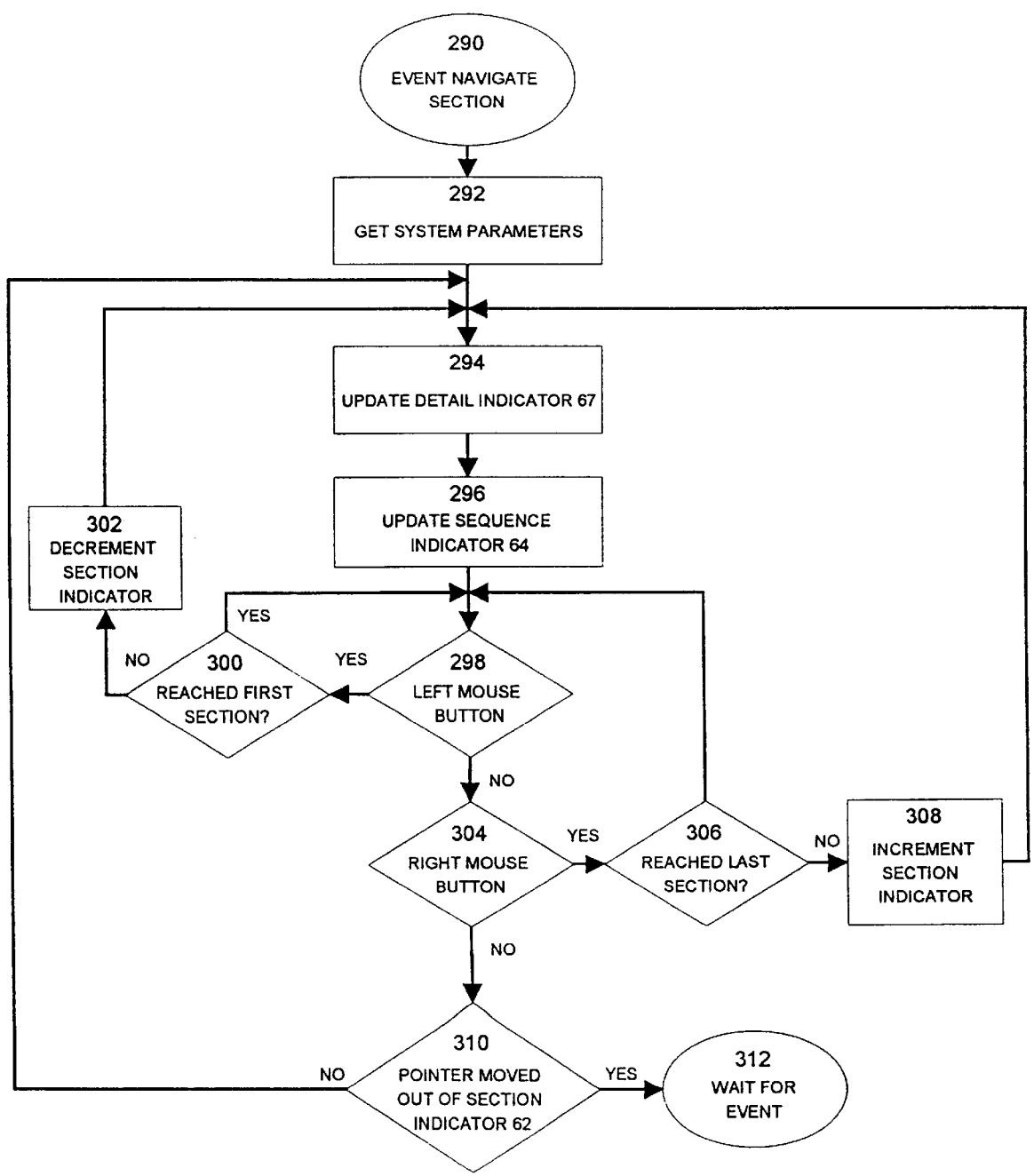

In FIG. 8H, event navigate section (block 290) is described. The navigation monolith must be active before entering this routine and a pointer has been placed over the section indicator 62 of the monolith 56 from FIG. 6A. The system parameters are obtained (block 292), including the current digital foil number, permissible range of navigation, and structure information. The detail indicator 67 from FIG. 6A is updated (block 294) to reflect the title of the current digital foil. Then the sequence indicator 64 from FIG. 6A is updated (block 296) to indicate to the presenter the current digital foil. A check is made for use of the left mouse button (block 298). The left mouse button navigates to previous sections one click at a time. If the left mouse button has been clicked by a presenter, a check is made to determine if the first section in the presentation has been reached (block 300). If the first section has been reached, then no further navigation is possible and control loops back to block 298. If the first section has not been reached, then the section indicator is decremented (block 302) and control is looped back to enter the first of two updates (block 294).

Continuing now from decision 298, another check is made for use of the right mouse button (block 304). The right mouse button navigates to next sections one click at a time. If the right mouse button has been clicked by a presenter, a check is made (block 306) to determine if the last section in the presentation has been reached. If the last section has been reached, then no further navigation is possible and control loops back to block 298. If the last section has not been reached, then the section indicator is incremented (block 308) and control is looped back to enter the first of two updates again (block 294).

A final check is made (block 310) to determine if the pointer has been moved by a presenter out of the section indicator 62 area. If not, then control is returned back (block 294); otherwise control is passed back to the wait for event routine (block 312).

Figure 8I:
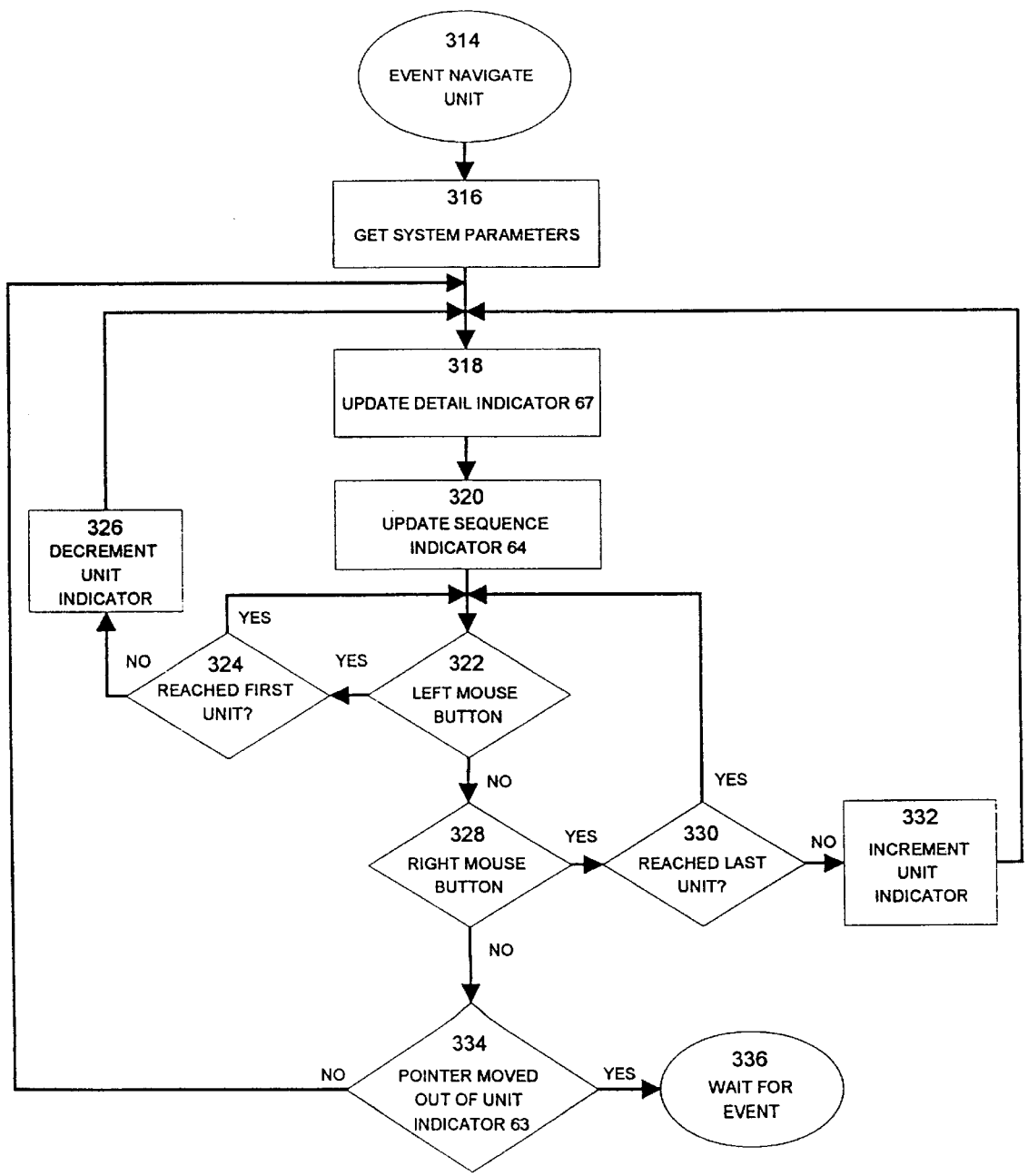

Referring now to FIG. 8I, event navigate unit (block 314) is described. The navigation monolith must be active before entering this routine and a pointer has been placed over the unit indicator 63 of the monolith 56. The system parameters are obtained (block 316) and include the current digital foil number, permissible range of navigation, and structure information. The detail indicator 67 from FIG. 6A is updated (block 318) to reflect the title of the current digital foil. Then the sequence indicator 64 from FIG. 6a is updated (block 320) to indicate to the presenter the current digital foil. A check is made for use of the left mouse button (block 268). The left mouse button navigates to previous units one click at a time. If the left mouse button has been clicked by a presenter, a check is made (block 322) to determine if the first unit in the presentation has been reached. If the first unit has been reached, then no further navigation is possible and a control loop back to block 392 is made. If the first unit has not been reached, then no further navigation is possible, the unit indicator is decremented (block 326) and control is looped back to enter the first of two updates (block 318).

Continuing now from decision block 322, a check is made for use of the right mouse button (block 328). The right mouse button navigates to next units one click at a time. If the right mouse button has been clicked by a presenter, a check is made (block 330) to determine if the last unit in the presentation has been reached. If the last unit has been reached, then no further navigation is possible and control loops back to block 322. If the last unit has not been reached, then the unit indicator is incremented (block 332) and control is looped back to enter the first of two updates again (block 318).

A final check is made (block 334) to determine if the pointer has been moved by a presenter out of the unit indicator 63 area. If not, then control is returned back (block 318); otherwise control is passed back to the wait for event routine (block 336).

Figure 9A:
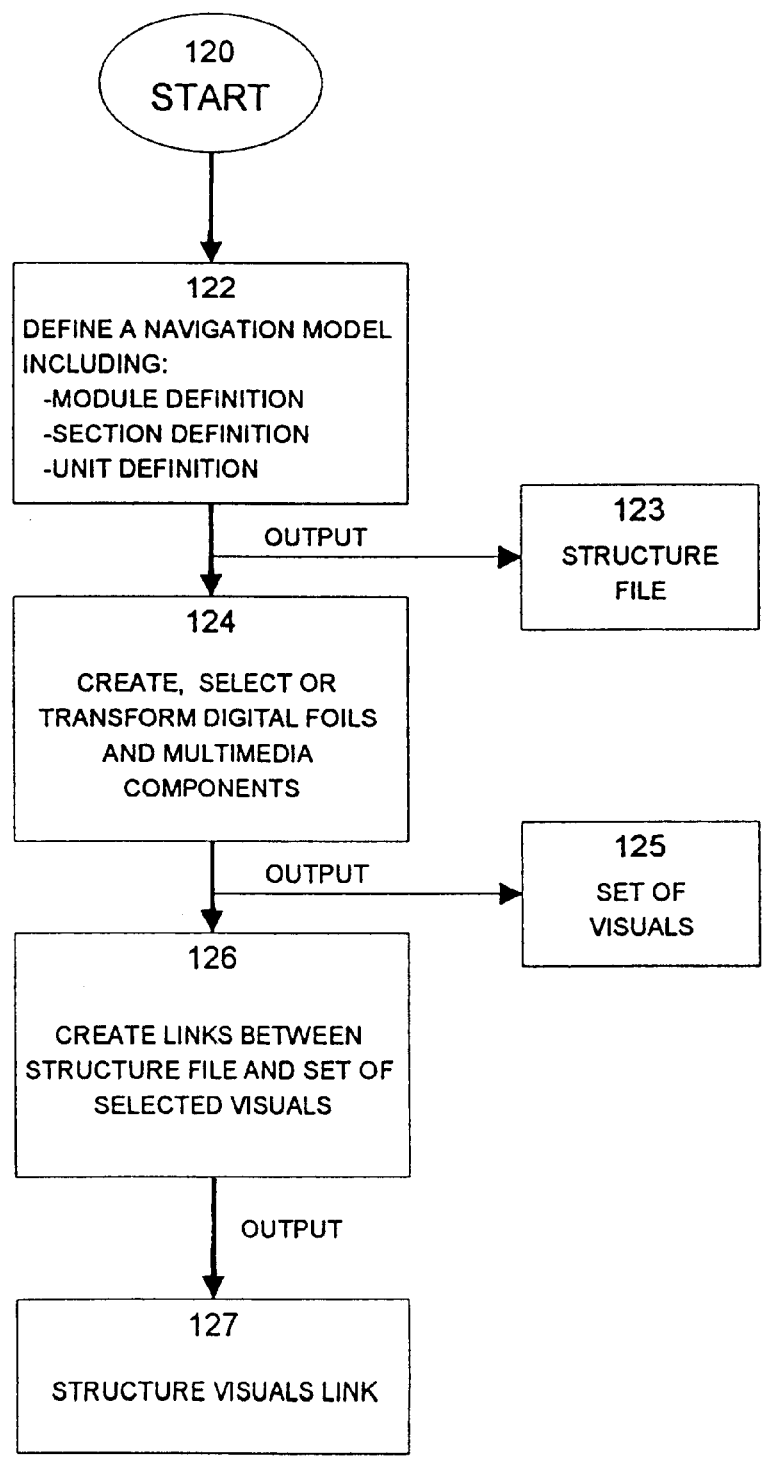
FIG. 9A is a flow diagram to provide presentation structure links to presentation digital foils.

In FIG. 9A, the process to create a structure with a set of digital foils for a presentation is described. The process starts at block 120 and ends at block 127 with a set of visuals linked to a defined structure. The order of the steps is arbitrary in that creation of the structure file 123 and set of digital foils 125 are not dependent on each other.

At block 122, a navigation model is defined by a presenter. The model includes module definition, section definition and unit definition. A structure file 123 is output from this step. At block 124, a set of digital foils, optionally having multimedia components, are created, or selected or transformed from existing transparent foils. The output from this step is a set of digital foils 125 which is typically placed into a multimedia database.

At block 126, links are created between the defined structure file 123 and set of digital foils 125 to provide a structural digital foil link having a predefined presentation sequence.

Figure 9B:
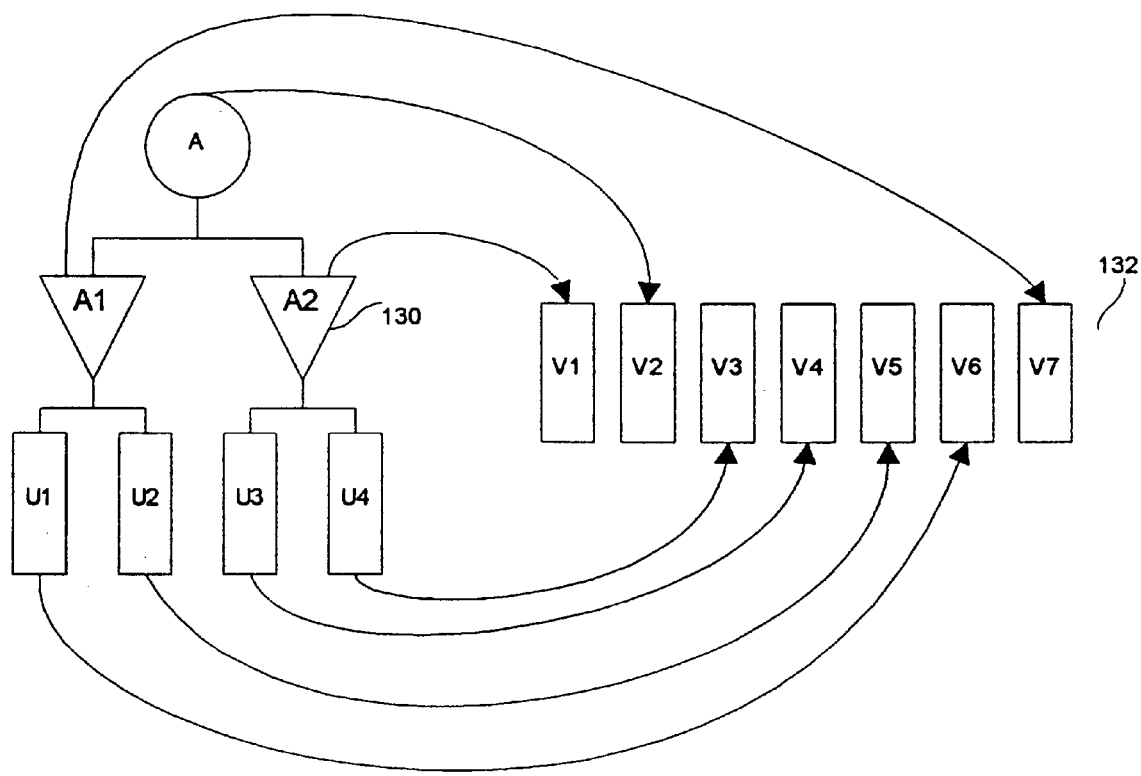
FIG. 9B is a diagrammatic representation of links between a presentation structure and a set of digital foils.

In FIG. 9B, an example structure generally indicated at 130 is shown having one module 'A', two sections 'A1 and A2' and four units 'U1, U2, U3, U4'. Each element of the structure is linked to a single digital foil from the set of digital foils generally indicated at 132.

Figure 9C:
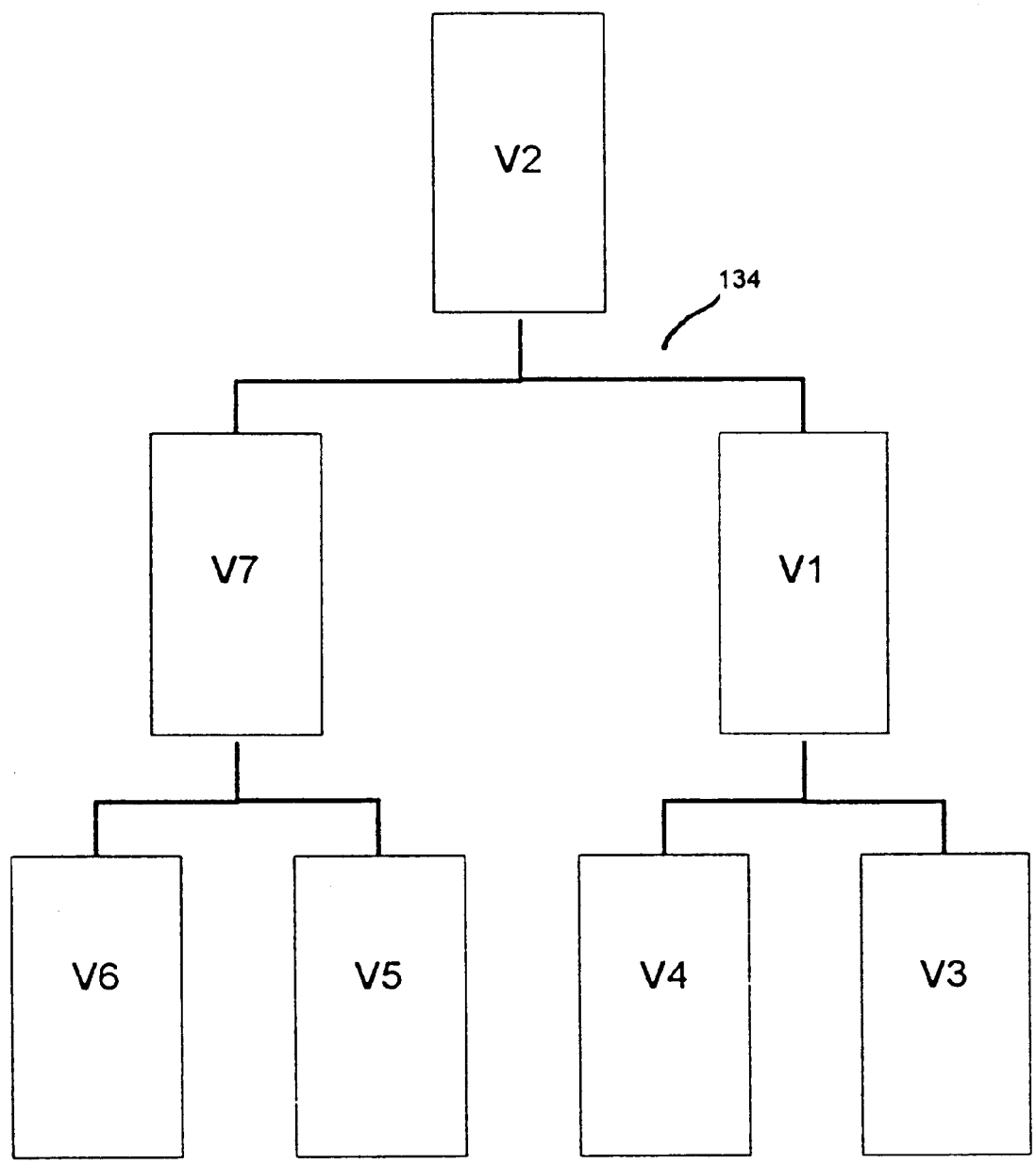
FIG. 9C is the resulting presentation and flow of digital foils.

The resulting predefined sequence for this example presentation is generally shown at 134 in FIG. 9C is a predefined sequence V2, V7, V6, V5, V1, V4, and V3. This pre-defined sequence may be navigated in a linear sense and in a non-linear sense at the section or unit level as the structure does not have multiple modules.

Figure 9D:
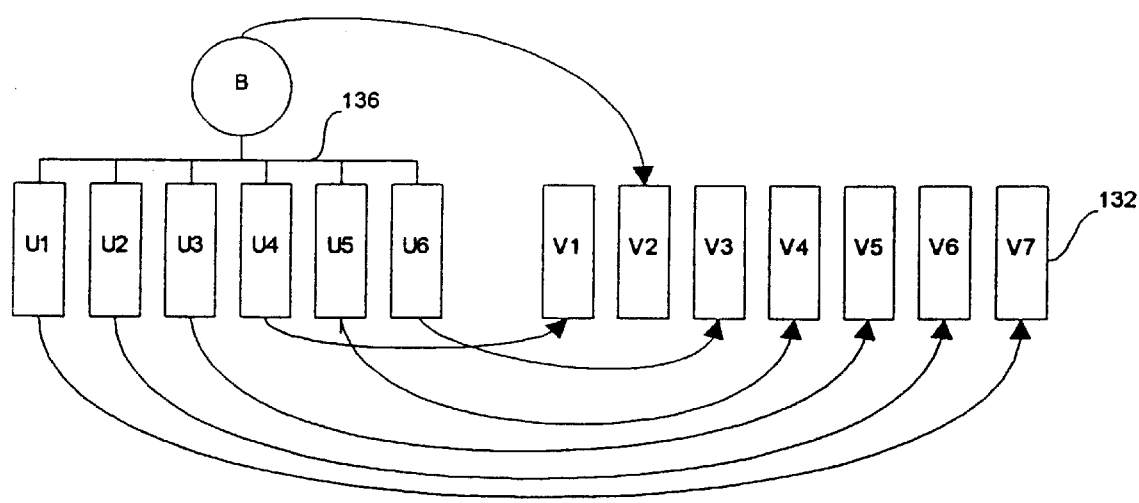
FIG. 9D is a diagrammatic representation of links between another presentation structure and a set of digital foils.

In FIG. 9D, a second example structure generally indicated at 136 is shown having one module 'B' with six units 'U1, U2, U3, U4, U5, and U6'. Each element of the structure is linked to a single digital foil from the same set of digital foils generally indicated at 132.

Figure 9E:
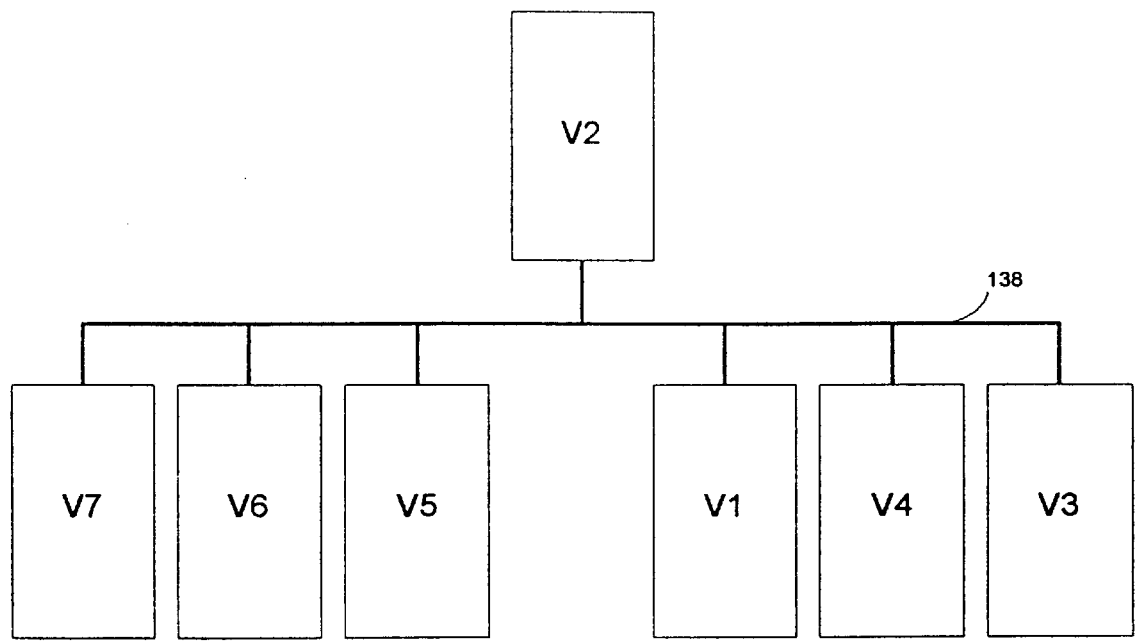
FIG. 9E is the resulting presentation and flow of digital foils.

The resulting predefined sequence for this example presentation is generally shown at 138 in FIG. 9E as a predefined sequence V2, V7, V7, V5, V1, V4 and V3. This pre-defined sequence may be navigated in a linear sense and in a non-linear unit sense as the structure does not have multiple modules or sections.

The resulting sequence 138 of FIG. 9E and sequence 134 of FIG. 9C is identical having different structures. This may occur depending on a preferred structure for different presenters, yet providing the same digital foil information to an audience.

Operation of the present invention is described with reference to FIGS. 4, 5, 10A and 10B. Referring first to FIG. 4, a presenter is delivering a live presentation using the hardware and software of the present invention. The presenter is located on a digital foil somewhere in the presentation and decides to perform a non-linear navigation, unit navigation from unit number '5', to unit number '4'. The presenter activates the navigation monolith 56 as previously described, and its contents are displayed to the presenter as shown at 160 of FIG. 10A. When the monolith is first displayed, the sequence indicator shows a '5' as current with a range of other units and the visual descriptor has a brief textual description relating to unit '5'.

The presenter then moves the pointer 3 into the module indicator as shown at 161 to check for module navigation. The sequence indicator now shows a 'B' with a range of other modules and the visual descriptor has a brief textual description relating to module 'B'.

When the presenter moves the pointer 3 into the section indicator as shown at 162 to check for section navigation, the sequence indicator and visual descriptor show null as this particular structure does not have any sections. Therefore, section navigation is not permitted.

Finally, the presenter moves the pointer 3 into the unit indicator as shown at 163 to perform unit navigation. The right mouse button is clicked twice to move the current unit to '4'. The visual descriptor also updates to provide a brief textual description relating to unit '4'.

Figure 10A:
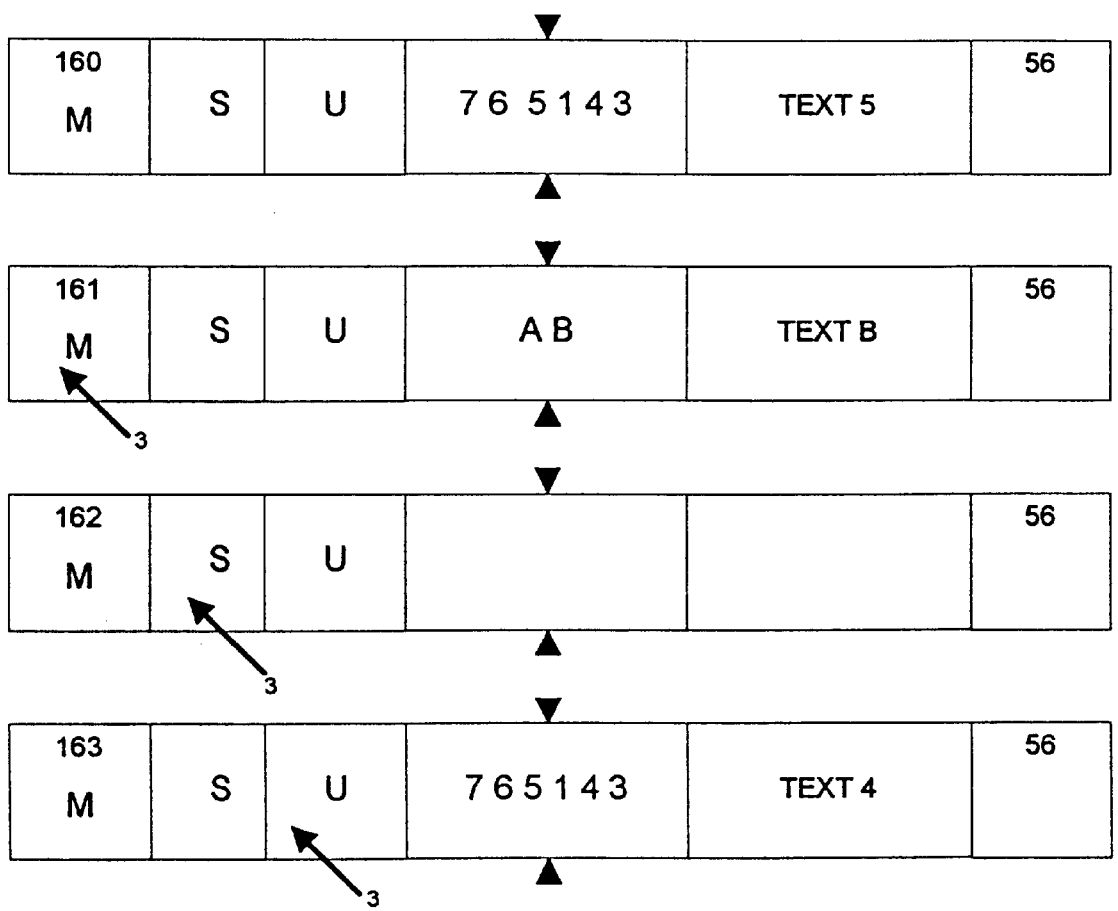
FIG. 10A illustrates a set of navigation monoliths for an example change in unit sequence.
Figure 10B:
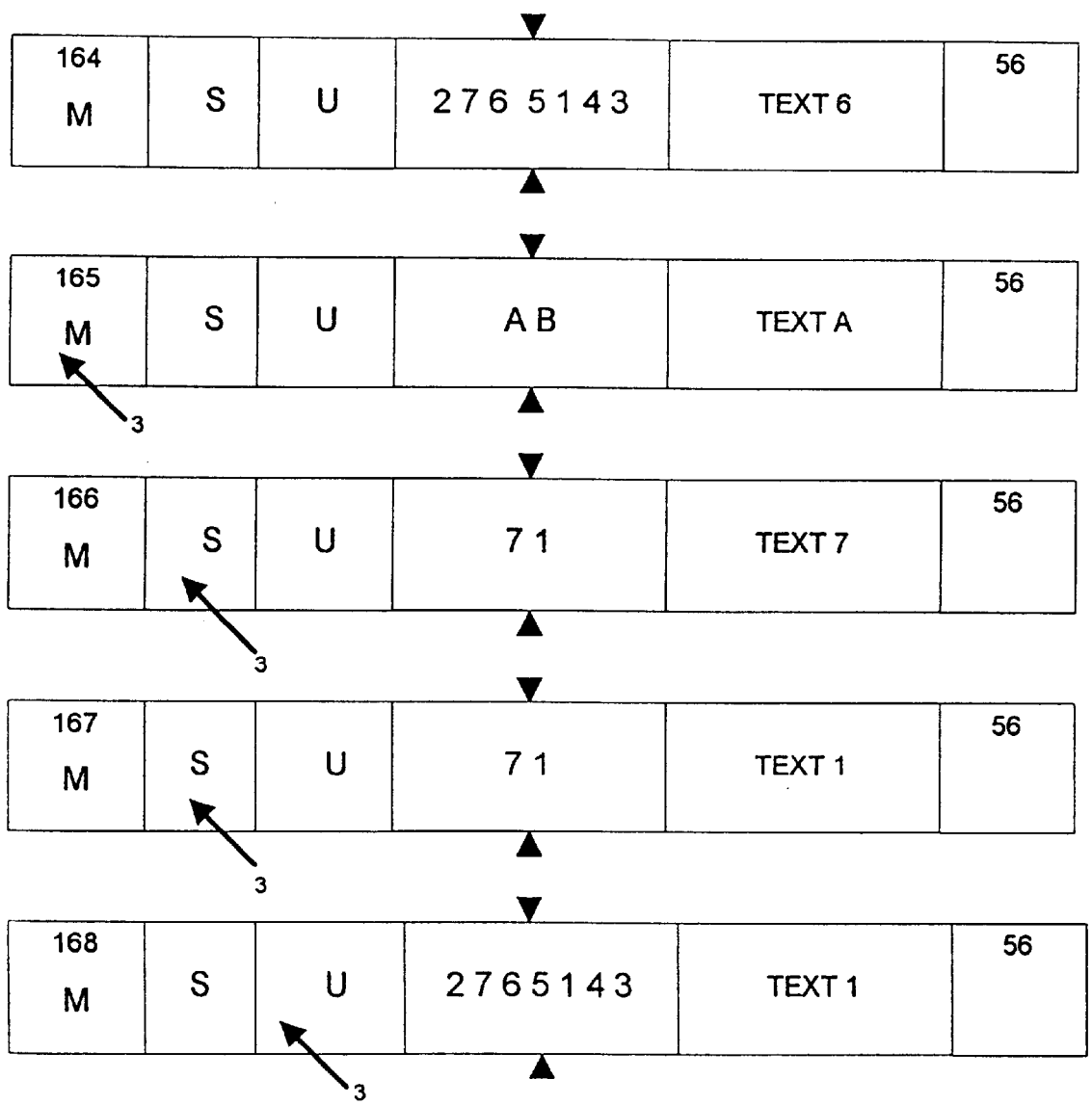
FIG. 10B illustrates a set of navigation monoliths for an example change in section sequence.

In the next example illustrated in FIG. 10B, the presenter decides to perform a non-linear section navigation from section number '7', to section number '1'. When the presenter activates the navigation monolith 56 in the manner previously described, its contents are displayed to the presenter as shown at 164 of FIG. 10B. The sequence indicator shows a '6' as current with a range of other units and the visual descriptor has a brief textual description relating to unit '6'.

The presenter then moves the pointer 3 into the module indicator as shown at 165 to check for module navigation. The sequence indicator now shows an 'A' with a range of other modules and the visual descriptor has a brief textual description relating to module 'A'.

The presenter next moves the pointer 3 into the section indicator as shown at 166 to check for section navigation. The sequence indicator now shows a '7' with a range of other sections and the visual descriptor has a brief textual description relating to section '7'. The presenter clicks the right mouse button to change sections as shown at 167. The sequence indicator now shows a '1' as the current section and the visual descriptor has a brief textual description relating to section '7'.

The presenter then moves the pointer 3 into the unit indicator as shown at 168 to check for unit navigation. The sequence indicator now shows a '1' as the current unit with a range of other units and the visual descriptor has a brief textual description relating to unit '1'. This is the first unit in section '7' which automatically displays unless changed by the presenter.

When the presenter is satisfied with the selection, the navigator monolith is deactivated, so that the monolith disappears from the display screen and the display screen is updated with the contents of the next digital foil.

Modifications of the present invention obvious to those skilled in the art are intended to be covered by the appended claims.

The embodiments of the invention in which an exclusive property or privilege is claimed are defined as follows:

1. A method of navigating a plurality of digital foils, for use by a human presenter making a presentation to an audience, the presentation employing a system having a graphical user interface for use by the user and an audience display upon which foils are displayed for viewing by the audience, the presentation including content selected by the user from among a plurality of hierarchically organized sets of foils, each foil including an information image to be displayed concurrently with additional information given by the presenter, the digital foils within each of the sets being arranged into a predetermined order, whereby the presenter presents the foils in a desired sequence which is different from the predetermined order, the method comprising the computer-implemented steps of:

storing a first variable of a total number of the plurality of foils to be included in the presentation and a second variable of a currently displayed foil;

simultaneously displaying, on the audience display, the currently displayed foil and displaying, on the graphical user interface, the currently displayed foil and an indicator having a listing of at least a portion of the plurality of foils, the listing giving the listed foils in the desired sequence for the presentation, and in the hierarchical organization, said indicator dynamically illustrating different portions of said hierarchical organization based on user selection of one of said portion of the plurality of foils;

in response to said user selection, incrementing or decrementing the second variable to correspond to a selected digital foil; and accessing the selected digital foil from the second variable.

2. A method of navigating a plurality of digital foils, according to claim 1, wherein the step of displaying an indicator having a listing of at least a portion of the plurality of foils comprises displaying said indicator integrated in the currently displayed foil.

3. A method of navigating a plurality of digital foils, according to claim 1, wherein the step of displaying an indicator having a listing of at least a portion of the plurality of foils includes identifying the currently displayed foil in said listing.

4. A method of navigating a plurality of digital foils, according to claim 1, wherein the step of displaying an indicator having a listing of at least a portion of the plurality of foils is executed in response to user selection.

5. A method of navigating a plurality of digital foils, according to claim 4, further comprising the step of hiding the indicator having a listing of at least a portion of the plurality of foils, wherein the step of hiding is executed in response to user selection.

6. A method of navigating a plurality of digital foils, according to claim 1, wherein the step of displaying an indicator having a listing of at least a portion of the plurality of foils comprises displaying an indicator having a plurality of hierarchical fields, a lowest of said hierarchical fields containing the listing of said at least a portion of the plurality of foils and higher hierarchical fields containing listings of predefined groups of the plurality of foils.

7. A method of navigating a plurality of digital foils, according to claim 6, further comprising the steps of:

displaying a listing in the lowest of said hierarchical fields for a different portion of the plurality of foils in response to user selection; and updating the higher hierarchical fields in the indicator for the different listing displayed.

8. A method of navigating a plurality of digital foils, according to claim 7, wherein the step of displaying a listing in the lowest of said hierarchical fields for a different portion of the plurality of foils is executed in response to user selection on a higher one of the hierarchical fields in the indicator.

9. A method of navigating a plurality of digital foils, according to claim 1, further comprising the step of displaying a listing in the indicator for a different portion of the plurality of foils, wherein the step of displaying is executed in response to user selection.

10. A method of navigating a plurality of digital foils, according to claim 1, wherein the step of incrementing or decrementing the second variable comprises comparing the first and second variables to verify navigation parameters.

11. A method according to claim 1, wherein said indicator includes a search button.

12. A method according to claim 1, wherein said indicator comprises a structural indicator.

13. A method according to claim 12, wherein said structural indicator includes a module indicator, a section indicator and a unit indicator.

14. A method according to claim 1, wherein said indicator comprises a visual indicator.

15. A method according to claim 14, wherein said visual indicator includes a sequence indicator and a visual descriptor.

16. A method according to claim 1, wherein said indicator comprises a structural indicator and a visual indicator, wherein said visual indicator changes depending upon user selection of said structural indicator.

17. A method according to claim 16, wherein said structural indicator includes a module indicator, a section indicator and a unit indicator and said visual indicator includes a sequence indicator and a visual descriptor, wherein said sequence indicator and said visual descriptor change depending upon user selection of said module indicator, said section indicator and said unit indicator.

18. A presentation system, for use by a human presenter making a presentation to an audience, the presentation including content selected by the user from among a plurality of hierarchically organized sets of foils, each foil including an information image to be displayed concurrently with additional information given by the presenter, the digital foils within each of the sets being arranged into a predetermined order, whereby the presenter presents the foils in a desired sequence which is different from the predetermined order, the system comprising:

a graphical user interface for use by the user;

an audience display upon which foils are displayed for viewing by the audience;

memory means for holding digital foils and for maintaining the digital foils in the hierarchically organized sets according to the predetermined order;

means for displaying the digitized foils from the memory on the audience display and the graphical user interface;

sequencing means for maintaining at least one user-desired presentation sequence, the presentation sequence including foils from a plurality of the hierarchically organized sets, the foils being in an order different from the predetermined order;

means for simultaneously displaying a currently displayed foil on the audience display and displaying, on the graphical user interface, the currently displayed foil and an indicator having a listing of at least a portion of the plurality of foils, the listing giving the listed foils in the desired sequence for the presentation, and in the hierarchical organization, said indicator dynamically illustrating different portions of said hierarchical organization based on user selection of one of said portion of the plurality of foils; and navigation means for selecting a selected one of the digital foils for one of (i) linear and (ii) non-linear display from said at least one presentation sequence based on the listing of the indicator.

19. A presentation system, according to claim 18, wherein the navigation means comprises an on-screen indicator for listing the digital foils in one presentation sequence.

20. A presentation system, according to claim 19, wherein the on-screen indicator includes means for displaying, in a narrow field on the means for displaying, the digitized foils from the memory.

21. A presentation system, according to claim 20, wherein the on-screen indicator includes means for displaying, the means for displaying being integrated in a displayed digitized foil.

22. A presentation system, according to claim 19, wherein the on-screen indicator includes means for displaying, the means for displaying being integrated in a displayed digitized foil.

23. A presentation system, according to claim 18, wherein:

the sequencing means includes means for grouping the digital foils hierarchically into at least one presentation sequence; and the navigation means includes an on-screen indicator for listing hierarchical levels for the digital foils in one presentation sequence.

24. A presentation system, according to claim 23, further comprising means for incrementing and decrementing any of the hierarchical levels listed in the on-screen indicator, whereby to alter the presentation sequence listing displayed.

25. A presentation system, according to claim 24,
further comprising means for accessing and displaying a digitized foil,
wherein the means for accessing and displaying is operable in response to user selection from the presentation sequence listing displayed in the indicator.

26. A presentation system, according to claim 24,
further comprising means for altering a presentation sequence defined in the sequencing means,
the means for altering being operable in response to user selections from the presentation sequence listing displayed in the indicator.

27. A presentation system, according to claim 23,
further comprising means for accessing and displaying a digitized foil,
wherein the means for accessing and displaying is operable in response to user selection from the presentation sequence listing displayed in the indicator.

28. A presentation system, according to claim 23,
further comprising means for altering a presentation sequence defined in the sequencing means,
the means for altering being operable in response to user selections from the presentation sequence listing displayed in the indicator.

29. A presentation system according to claim 18, wherein said indicator includes a search button.

30. A presentation system according to claim 18, wherein said indicator comprises a structural indicator.

31. A presentation system according to claim 30, wherein said structural indicator includes a module indicator, a section indicator and a unit indicator.

32. A presentation system according to claim 18, wherein said indicator comprises a visual indicator.

33. A presentation system according to claim 32, wherein said visual indicator includes a sequence indicator and a visual descriptor.

34. A presentation system according to claim 18, wherein said indicator comprises a structural indicator and a visual indicator, wherein said visual indicator changes depending upon user selection of said structural indicator.

35. A presentation system according to claim 34, wherein said structural indicator includes a module indicator, a section indicator and a unit indicator and said visual indicator includes a sequence indicator and a visual descriptor,
wherein said sequence indicator and said visual descriptor change depending upon user selection of said module indicator, said section indicator and said unit indicator.

36. A navigator, for use by a human presenter making a presentation to an audience, the presentation employing a system having a graphical user interface for use by the user and an audience display upon which foils are displayed for viewing by the audience, the presentation including content selected by the user from among a plurality of hierarchically organized sets of foils, each foil including an information image to be displayed concurrently with additional information given by the presenter, the digital foils within each of the sets being arranged into a predetermined order, whereby the presenter presents the foils in a desired sequence which is different from the predetermined order, the navigator comprising:
means for simultaneously displaying, on the audience display, a currently displayed foil and displaying, on the graphical user interface, the currently displayed foil and an indicator for identifying at least a portion of the digitized foils, the indicator means including means for displaying within a narrow field on the presentation medium, the indicator means giving the listed foils in the desired sequence for the presentation, and in the hierarchical organization, said indicator means dynamically illustrating different portions of said hierarchical organization based on user selection of one of said portion of the digitized foils;
sequencing means for maintaining at least one user-desired presentation sequence, the presentation sequence including foils from a plurality of the hierarchically organized sets, the foils of the presentation sequence including the currently displayed foil, the foils being in an order different from the predetermined order;
selection means for selecting a digitized foil from the digitized foils identified in the indicator means.

37. A navigator, according to claim 36, wherein the on-screen indicator includes means for displaying within a narrow field on a displayed digitized foil.

38. A navigator, according to claim 37, wherein the displayed digitized foil includes boundary frames and the on-screen indicator includes means for displaying adjacent to one of said boundary frames.

39. A navigator, according to claim 37, wherein the on-screen indicator includes means for displaying in a colour corresponding to a background colour of the displayed digitized foil.

40. A navigator, according to claim 36, further comprising means for retaining a pre-defined presentation sequence of the digital foils.

41. A navigator, according to claim 36,
further comprising means for retaining a pre-defined hierarchical presentation sequence of the digital foils,
wherein the on-screen indicator includes fields for listing each level of the hierarchical presentation sequence of said at least a portion of the digitized foils.

42. A navigator, according to claim 41,
wherein the selection means comprises means for incrementing and decrementing the fields for listing each level of the hierarchical presentation sequence,
whereby the portion of the digitized foils identified in the on-screen indicator is altered.

43. A navigator according to claim 36, wherein said indicator includes a search button.

44. A navigator according to claim 36, wherein said indicator comprises a structural indicator.

45. A navigator according to claim 44, wherein said structural indicator includes a module indicator, a section indicator and a unit indicator.

46. A navigator according to claim 36, wherein said indicator comprises a visual indicator.

47. A navigator according to claim 46, wherein said visual indicator includes a sequence indicator and a visual descriptor.

48. A navigator according to claim 36, wherein said indicator comprises a structural indicator and a visual indicator, wherein said visual indicator changes depending upon user selection of said structural indicator.

49. A navigator according to claim 48, wherein said structural indicator includes a module indicator, a section indicator and a unit indicator and said visual indicator includes a sequence indicator and a visual descriptor,
wherein said sequence indicator and said visual descriptor change depending upon user selection of said module indicator, said section indicator and said unit indicator.

50. A computer program product, for use with a processing and display control system for displaying and projecting image transparencies, the image transparencies being recited herein as "digital foils", for navigating a plurality of digital foils, for use by a human presenter making a presentation to an audience, the processing and display control system having a graphical user interface for use by the user and an audience display upon which foils are displayed for viewing by the audience, the presentation including content selected by the user from among a plurality of hierarchically organized sets of foils, each foil including an information image to be displayed concurrently with additional information given by the presenter, the digital foils within each of the sets being arranged into a predetermined order, whereby the presenter presents the foils in a desired sequence which is different from the predetermined order, the computer program product comprising:

a computer readable recording medium;

computer-readable program means recorded on the medium, for directing the processing and display control system to store a first variable of a total number of the plurality of foils to be included in the presentation and a second variable of a currently displayed foil;

computer-readable program means, recorded on the medium, for directing the processing and display control system to simultaneously display, on the audience display, the currently displayed foil and display on the graphical user interface, the currently displayed foil and an indicator having a listing of at least a portion of the plurality of foils, the listing giving the listed foils in the desired sequence for the presentation, and in the hierarchical organization, said indicator dynamically illustrating different portions of said hierarchical organization based on user selection of one of said portion of the plurality of foils;

computer-readable program means, recorded on the medium, for directing the processing and display control system, in response to said user selection, to increment or decrement the second variable to correspond to a selected digital foil;

computer-readable program means, recorded on the medium, for directing the processing and display control system to access the selected digital foil from the second variable.

51. A computer program product, according to claim 50, wherein the means for directing to displaying an indicator having a listing of at least a portion of the plurality of foils includes computer-readable program means, recorded on the medium, for directing the processing and display control system to display said indicator integrated in the currently displayed foil.

52. A computer program product, according to claim 50, wherein the means for directing to display an indicator having a listing of at least a portion of the plurality of foils includes computer-readable program means, recorded on the medium for directing the processing and display control system to identify the currently displayed foil in said listing.

53. A computer program product, according to claim 50, wherein the means for directing to display an indicator having a listing of at least a portion of the plurality of foils is executed in response to user selection.

54. A computer program product, according to claim 53, further comprising computer-readable program means, recorded on the medium, for directing the processing and display control system to hide the indicator having a listing of at least a portion of the plurality of foils, wherein the means for directing to hide is executed in response to user selection.

55. A computer program product, according to claim 50, wherein the means for directing to display an indicator having a listing of at least a portion of the plurality of foils includes computer-readable program means, recorded on the medium, for directing the processing and display control system to display an indicator having a plurality of hierarchical fields, a lowest of said hierarchical fields containing the listing of said at least a portion of the plurality of foils and higher hierarchical fields containing listings of predefined groups of the plurality of foils.

56. A computer program product, according to claim 55, further comprising:

computer-readable program means, recorded on the medium, for directing the processing and display control system to display a listing in the lowest of said hierarchical fields for a different portion of the plurality of foils in response to user selection; and computer-readable program means, recorded on the medium, for directing the processing and display control system to update the higher hierarchical fields in the indicator for the different listing displayed.

57. A computer program product, according to claim 56, wherein the means for directing to display a listing in the lowest of said hierarchical fields for a different portion of the plurality of foils is executed in response to user selection on a higher one of the hierarchical fields in the indicator.

58. A computer program product, according to claim 50, further comprising computer-readable program means, recorded on the medium, for directing the processing and display control system to display a listing in the indicator for a different portion of the plurality of foils, wherein the means for directing to display is executed in response to user selection.

59. A computer program product, according to claim 50, wherein the means for directing to increment or decrement the second variable includes computer-readable program means, recorded on the medium, for directing the processing and display control system to compare the first and second variables to verify navigation parameters.

60. A computer program product according to claim 50, wherein said indicator includes a search button.

61. A computer program product according to claim 50, wherein said indicator comprises a structural indicator.

62. A computer program product according to claim 61, wherein said structural indicator includes a module indicator, a section indicator and a unit indicator.

63. A computer program product according to claim 50, wherein said indicator comprises a visual indicator.

64. A computer program product according to claim 63, wherein said visual indicator includes a sequence indicator and a visual descriptor.

65. A computer program product according to claim 50, wherein said indicator comprises a structural indicator and a visual indicator, wherein said visual indicator changes depending upon user selection of said structural indicator.

66. A computer program product according to claim 65, wherein said structural indicator includes a module indicator, a section indicator and a unit indicator and said visual indicator includes a sequence indicator and a visual descriptor, wherein said sequence indicator and said visual descriptor change depending upon user selection of said module indicator, said section indicator and said unit indicator.

* * * * *